(12) United States Patent
Murase et al.

(10) Patent No.: US 10,336,044 B2
(45) Date of Patent: Jul. 2, 2019

(54) LAMINATED FILM AND PACKAGING BAG

(71) Applicant: TOPPAN PRINTING CO., LTD., Tokyo (JP)

(72) Inventors: Tomokazu Murase, Tokyo (JP); Junpei Hayashi, Tokyo (JP); Shigekazu Yasutake, Tokyo (JP); Ryukichi Matsuo, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/714,830

(22) Filed: Sep. 25, 2017

(65) Prior Publication Data

US 2018/0009206 A1    Jan. 11, 2018

Related U.S. Application Data

(63) Continuation of application No. PCT/JP2016/059737, filed on Mar. 25, 2016.

(30) Foreign Application Priority Data

Mar. 27, 2015  (JP) ................. 2015-066809
Mar. 27, 2015  (JP) ................. 2015-066811
Mar. 27, 2015  (JP) ................. 2015-066814

(51) Int. Cl.
*B32B 27/18*  (2006.01)
*B32B 1/02*   (2006.01)
(Continued)

(52) U.S. Cl.
CPC ............ *B32B 27/18* (2013.01); *B32B 1/02* (2013.01); *B32B 9/00* (2013.01); *B32B 27/06* (2013.01);
(Continued)

(58) Field of Classification Search
CPC .. B32B 1/02; B32B 1/08; B32B 27/06; B32B 27/08; B32B 27/18; B32B 27/20;
(Continued)

(56) References Cited

U.S. PATENT DOCUMENTS 5,770,301 A    6/1998  Murai et al.
5,981,029 A    11/1999 Harada et al.
(Continued)

FOREIGN PATENT DOCUMENTS

CN   102481769 A   5/2012
JP   10-166516 A   6/1998
(Continued)

OTHER PUBLICATIONS

European Patent Office, "Communication with Extended Search Report," issued in connection with European Patent Application No. 16 772 675.1, dated Jul. 16, 2018.
(Continued)

*Primary Examiner* — Walter Aughenbaugh
(74) *Attorney, Agent, or Firm* — Foley & Lardner LLP

(57) ABSTRACT

A laminated film including a resin substrate, and a coating layer on the resin substrate. The coating layer contains a water-soluble polymer, at least one of a silane coupling agent and a hydrolysate thereof, at least one of a metal alkoxide and a hydrolysate thereof, and an inorganic layered compound.

21 Claims, 8 Drawing Sheets

(51) Int. Cl.

| | |
|---|---|
| *B32B 27/20* | (2006.01) |
| *B32B 27/36* | (2006.01) |
| *B32B 27/06* | (2006.01) |
| *B32B 27/32* | (2006.01) |
| *B32B 27/08* | (2006.01) |
| *B32B 27/38* | (2006.01) |
| *B32B 9/00* | (2006.01) |
| *B65D 65/40* | (2006.01) |
| *B65D 81/24* | (2006.01) |
| *B32B 27/40* | (2006.01) |
| *C08J 7/04* | (2006.01) |

(52) U.S. Cl.
CPC .............. *B32B 27/08* (2013.01); *B32B 27/20* (2013.01); *B32B 27/32* (2013.01); *B32B 27/327* (2013.01); *B32B 27/36* (2013.01); *B32B 27/38* (2013.01); *B32B 27/40* (2013.01); *B65D 65/40* (2013.01); *B65D 81/24* (2013.01); *C08J 7/04* (2013.01); *C08J 7/042* (2013.01); *C08J 7/045* (2013.01); *B32B 2307/518* (2013.01); *B32B 2307/724* (2013.01); *B32B 2309/105* (2013.01); *B32B 2553/00* (2013.01); *C08J 2323/12* (2013.01); *C08J 2429/04* (2013.01)

(58) Field of Classification Search
CPC ....... B32B 27/28; B32B 27/32; B32B 27/327; B32B 27/34; B32B 27/36; B32B 27/38; B32B 27/40

See application file for complete search history.

(56) References Cited

U.S. PATENT DOCUMENTS

| | | | |
|---|---|---|---|
| 6,656,602 B1 * | 12/2003 | Ishikawa | C08J 7/047 428/35.4 |
| 2004/0253463 A1 * | 12/2004 | Inui | B32B 27/06 428/448 |
| 2005/0214530 A1 | 9/2005 | Tanaka et al. | |
| 2012/0128956 A1 | 5/2012 | Takatsu et al. | |

FOREIGN PATENT DOCUMENTS

| | | | |
|---|---|---|---|
| JP | H10-264292 | A | 10/1998 |
| JP | 2000-254994 | A | 9/2000 |
| JP | 2001-009982 | A | 1/2001 |
| JP | 2001-315250 | A | 11/2001 |
| JP | 2002-316381 | A | 10/2002 |
| JP | 3441594 | B2 | 9/2003 |
| JP | 2004-217766 | A | 8/2004 |
| JP | 2004-331460 | A | 11/2004 |
| JP | 2005-001242 | A | 1/2005 |
| JP | 2005-144878 | A | 6/2005 |
| JP | 2007-331187 | A | 12/2007 |
| JP | 2011-031455 | A | 2/2011 |
| JP | 2012-158348 | A | 8/2012 |
| JP | 2013-237271 | A | 11/2013 |
| JP | 2014-076609 | A | 5/2014 |
| WO | WO 2004/048081 | A | 6/2004 |

OTHER PUBLICATIONS

International Search Report and Written Opinion, PCT/JP2016/059737, Toppan Printing Co., Ltd., 6 pages (Jun. 14, 2016).
Chinese Office Action dated Dec. 13, 2018 in corresponding application No. 201680017171.2.

* cited by examiner

LAMINATED FILM AND PACKAGING BAG

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/059737, filed on Mar. 25, 2016, which is based upon and claims the benefit of priority of Japanese Patent Application No. 2015-066809, filed on Mar. 27, 2015, Japanese Patent Application No. 2015-066811, filed on Mar. 27, 2015, and Japanese Patent Application No. 2015-066814, filed on Mar. 27, 2015, the entireties of which are hereby incorporated by reference.

TECHNICAL FIELD

The present invention relates to a laminated film and a packaging bag.

BACKGROUND

Packaging materials used for packaging contents are required to suppress quality deterioration of the contents. The quality deterioration of the contents may be accelerated by atmospheric gases permeating the packaging materials. Therefore, various laminated films are under development as materials for packaging bags, to suppress gas permeation from the atmosphere.

For example, Patent Literature 1 proposes a technique for improving gas barrier properties by providing a gas barrier deposited thin film layer and a gas barrier coated layer on a resin substrate. Patent Literature 2 proposes a technique for improving gas barrier properties of a packaging material by sequentially laminating a transparent primer layer, a deposited thin film layer, and a gas barrier composite film on one side of a polypropylene substrate.

CITATION LIST

Patent Literature

Patent Literature 1: WO 2004/048081 A
Patent Literature 2: JP 2000-254994 A

SUMMARY OF THE INVENTION

Technical Problem

It is considered that providing a gas barrier deposited thin film layer on the laminated film is effective from the viewpoint of improving both oxygen barrier properties and moisture barrier properties. On the other hand, for example, in the case of a packaging bag for packaging food originally containing moisture, it is required that the packaging bag has good oxygen barrier properties rather than having good moisture barrier properties. Therefore, a packaging bag having good oxygen barrier properties and a laminated film that can be used for the packaging bag is sought.

Accordingly, in an aspect, the present invention provides a laminated film having good oxygen barrier properties, and a packaging bag.

From the viewpoint of improving gas barrier properties, it is effective to provide a deposited thin film layer made of a metal oxide to a laminated film; however, when the deposited thin film layer is provided, manufacturing cost tends to increase. Therefore, there is a need for a laminated film that improves oxygen barrier properties without being provided with a deposited thin film layer.

To improve sealing performance of a packaging bag, in addition to improving gas barrier properties, it is necessary to increase lamination strength of the laminated film constituting the packaging bag. However, according to the studies of the present inventors, it has been found that the lamination strength of the laminated film varies greatly depending on the composition of the underlayer and the coating layer.

Accordingly, in another aspect, the present invention provides a laminated film capable of reducing variation in lamination strength caused by a change in the composition of the underlayer. In addition, the present invention provides a packaging bag having good sealing performance by being provided with such a laminated film.

To improve gas barrier properties, it is effective to laminate various films of different materials. On the other hand, particularly high moisture barrier properties may be required in applications of food packaging and building materials, for example. However, although various kinds of conventional packaging materials having high gas barrier properties have been developed, there is still room for improvement in moisture barrier properties.

Accordingly, in still another aspect, the present invention provides a laminated film having very good moisture barrier properties, and a packaging bag.

Solution to Problem

In one aspect, the present invention provides a laminated film, including a resin substrate, and a coating layer on the resin substrate. In the laminated film, the coating layer contains a water-soluble polymer, at least one of a silane coupling agent and a hydrolysate thereof, at least one of a metal alkoxide and a hydrolysate thereof, and an inorganic layered compound.

Since the laminated film has a coating layer containing a water-soluble polymer, at least one of a silane coupling agent and a hydrolysate thereof, at least one of a metal alkoxide and a hydrolysate thereof, and an inorganic layered compound, the laminated film has good oxygen barrier properties. Such a laminated film is particularly useful, for example, in applications requiring good oxygen barrier properties rather than moisture barrier properties. The content of the inorganic layered compound in the coating layer is preferably 2 to 5 mass %. Preferably, the resin substrate has a biaxially oriented polypropylene film.

In some embodiments, the laminated film may include an underlayer between the resin substrate and the coating layer. When the underlayer is provided, adhesion between the resin substrate and the coating layer can be improved. Such an effect is particularly useful, for example, in the case of a substrate having low polarity such as a resin substrate composed of polypropylene or the like. Preferably, the underlayer contains an organic polymer as a main component. The coating layer has good oxygen barrier properties and good adhesion with the underlayer containing an organic polymer as a main component. The coating layer can maintain good adhesion even when the composition of the underlayer is changed. Therefore, the laminated film can reduce variation in lamination strength caused by a change in the composition of the underlayer. Preferably, the organic polymer contains at least one of polyols, organosilane compounds, water-based polyurethane resins, and reaction products of the polyols and the organosilane compounds.

In the laminated film of some embodiments, at least one of the silane coupling agent and the hydrolysate thereof may have an epoxy group in the molecular structure. When the coating layer contains a silane coupling agent or a hydrolysate thereof having an epoxy group, the oxygen barrier properties of the coating layer are further improved. In addition, a gelation reaction is suppressed at the time of forming the coating layer. Thus, a coating layer having high uniformity can be formed.

In the laminated film of some embodiments, the content of the silane coupling agent and the hydrolysate thereof in the coating layer may be 1 to 15 mass % in total. In some embodiments, the laminated film may include a deposited thin film layer in between the resin substrate and the coating layer, the deposited thin film layer containing a silicon oxide.

In the laminated film of some embodiments, the deposited thin film layer may have a thickness of 5 to 100 nm. In some embodiments, the laminated film may have a lamination strength of 2 N/15 mm or more. In some embodiments, the laminated film may have a moisture permeation rate of 2 $g/m^2/day$ or less. In some embodiments, the laminated film may have an oxygen permeation rate of 2 $ml/m^2/day$ or less.

The present invention provides a packaging bag formed by bonding films with each other, in which the film includes the aforementioned laminated film. The packaging bag has good oxygen barrier properties because it is provided with the aforementioned laminated film. Such a packaging bag is particularly useful for applications requiring good oxygen barrier properties rather than good moisture barrier properties.

In another aspect, the present invention provides a laminated film, including: a resin substrate; a coating layer containing a water-soluble polymer, at least one of a silane coupling agent and a hydrolysate thereof, at least one of a metal alkoxide and a hydrolysate thereof, and an inorganic layered compound; and an underlayer containing an organic polymer as a main component between the resin substrate and the coating layer.

The laminated film has a coating layer containing a water-soluble polymer, at least one of a silane coupling agent and a hydrolysate thereof, at least one of a metal alkoxide and a hydrolysate thereof, and an inorganic layered compound. Such a coating layer has good oxygen barrier properties and good adhesion with the underlayer containing an organic polymer as a main component. The coating layer can maintain good adhesion even when the composition of the underlayer is changed. Therefore, the laminated film can reduce variation in lamination strength caused by a change in the composition of the underlayer.

In the laminated film of some embodiments, at least one of the silane coupling agent and the hydrolysate thereof may have an epoxy group in the molecular structure. When the coating layer contains a silane coupling agent or a hydrolysate thereof having an epoxy group, the lamination strength of the laminated film is increased. In addition to this, the oxygen barrier properties of the coating layer can be improved.

In the laminated film of some embodiments, the content of the silane coupling agent and its hydrolysate in the coating layer may be 1 to 15 mass % in total. Thus, while reducing variation in the lamination strength, a laminated film with very good oxygen barrier properties can be formed.

In the laminated film of some embodiments, the organic polymer in the underlayer may contain at least one of polyols, organosilane compounds, water-based polyurethane resins, and reaction products of the polyols and the organosilane compounds. When such an underlayer is provided, variation in the lamination strength can be further reduced. Further, in some embodiments, the lamination strength may be 2 N/15 mm or more.

The present invention provides a packaging bag formed by bonding films with each other, in which the film includes the aforementioned laminated film. The packaging bag has good sealing performance because it has a laminated film capable of reducing variation in the lamination strength caused by a change in the composition of the underlayer.

In another aspect, the present invention further provides a laminated film, including: a resin substrate having a biaxially oriented polypropylene film; a deposited thin film layer containing a silicon oxide; and an underlayer containing an organic polymer as a main component, the underlayer being located between the resin substrate and the deposited thin film layer.

The laminated film has a deposited thin film layer containing a silicon oxide. The deposited thin film layer containing a silicon oxide is superior in moisture barrier properties to a deposited thin film layer of a metal oxide instead of a silicon oxide. In addition to this, the laminated film has a biaxially oriented polypropylene film having good gas barrier properties. However, the biaxially oriented polypropylene film tends to have larger asperity on the surface than other films such as of PET. Therefore, when a deposited thin film layer is provided directly on the resin substrate having the biaxially oriented polypropylene film, cracks or the like occur, causing deterioration of moisture barrier properties. In this regard, the laminated film according to an aspect of the present invention includes an underlayer containing an organic polymer as a main component located between the resin substrate and the deposited thin film layer. Thus, adhesion between the resin substrate and the deposited thin film layer can be improved. In addition to the adhesion improving effect, the laminated film is permitted to have sufficient moisture barrier properties by combining the biaxially oriented polypropylene film having good moisture barrier properties and the deposited thin film layer containing a silicon oxide. Such a laminated film is particularly useful, for example, in applications requiring good moisture barrier properties rather than good oxygen barrier properties. However, applications requiring good oxygen barrier properties are not excluded.

In some embodiments, the laminated film may be provided with a coating layer on a side opposite to the underlayer side of the deposited thin film layer. The coating layer may contain a water-soluble polymer, at least one of a silane coupling agent and a hydrolysate thereof, at least one of a metal alkoxide and a hydrolysate thereof, and an inorganic layered compound. Such a laminated film can achieve both moisture barrier properties and oxygen barrier properties at a high level.

The organic polymer in the underlayer may contain at least one of polyols, organosilane compounds, water-based polyurethane resins, and reaction products of the polyols and the organosilane compounds. The underlayer containing such an organic polymer as a main component has good adhesiveness and good transparency.

The deposited thin film layer may have a thickness of 5 to 100 nm. The laminated film having the deposited thin film layer with such a thickness has both much better moisture barrier properties and high flexibility and transparency.

In some embodiments, the laminated film may have a moisture permeation rate of 2 $g/m^2/day$ or less. The laminated film having such a sufficiently low moisture permeation rate is particularly useful in applications requiring high moisture barrier properties. In some embodiments, the laminated film may have a lamination strength of 2 N/15 mm or more. In some embodiments, the laminated film may have an oxygen permeation rate of 2 ml/m²/day or less.

The present invention provides a packaging bag formed by bonding films with each other, in which the films include the aforementioned laminated film. The packaging bag has good moisture barrier properties, or both of moisture barrier properties and oxygen barrier properties because it is provided with the aforementioned laminated film. Such a packaging bag is particularly useful for applications requiring good moisture barrier properties, or both of good moisture barrier properties and oxygen barrier properties.

Advantageous Effects of the Invention

In an aspect, the present invention can provide a laminated film having good oxygen barrier properties, and a packaging bag.

In another aspect, the present invention can provide a laminated film capable of reducing variation in the lamination strength caused by a change in the composition of the underlayer. In addition, the present invention can provide a packaging bag having good sealing performance by including the aforementioned laminated film.

In still another aspect, the present invention can provide a laminated film having very good moisture barrier properties, and a packaging bag.

DESCRIPTION OF REPRESENTATIVE EMBODIMENTS

Figure 1:
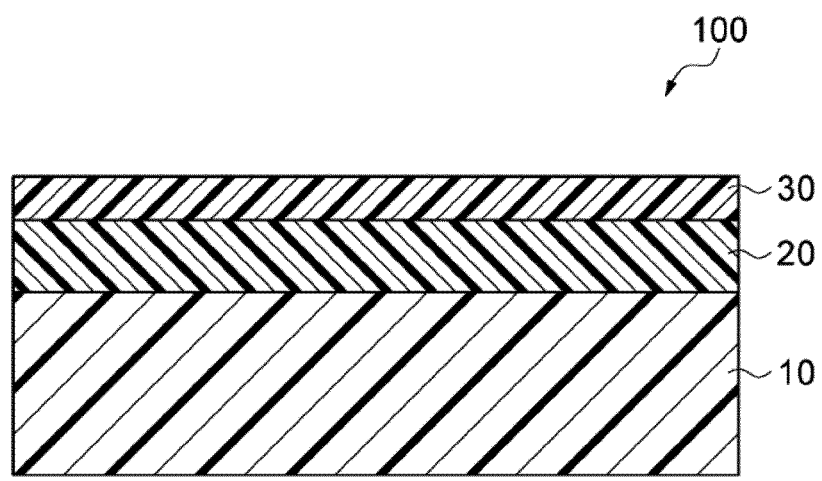
FIG. 1 is a schematic sectional view illustrating a first embodiment of a laminated film.

Hereinafter, some embodiments of the present invention will be described with reference to the drawings where necessary. However, it is to be understood that the present invention is not necessarily limited to these embodiments. The embodiments describe below are intended to be representative of the present invention. In each drawing, the same reference numerals are given to the same or equivalent elements, to omit duplicate description.

<Laminated Film>

First Embodiment

FIG. 1 is a schematic sectional view of a laminated film according to a first embodiment. A laminated film 100 has a film-like resin substrate 10; and an underlayer 20 and a coating layer 30 formed in this order on a surface of the resin substrate 10.

The resin substrate 10 is made of a resin film. Examples of the resin film include polyester films such as of polyethylene terephthalate (PET) or polyethylene naphthalate (PEN); polyolefin films such as of polyethylene or polypropylene; polystyrene films; polyamide films such as of 66-nylon; polycarbonate films; and engineering plastic films such as a polyacrylonitrile film or a polyimide film.

The above resin films may be used alone or in combination of two or more. The resin substrate 10 may be formed by laminating a plurality of the same resin films. The resin film may be either stretched or unstretched. The resin film may be a laminate of at least one stretched film and at least one unstretched film. If the resin substrate 10 has a film arbitrarily stretched in the biaxial direction, mechanical strength and dimensional stability can be improved.

From the viewpoint of further improving oxygen barrier properties, preferably, the aforementioned resin substrate 10 contains a biaxially oriented polypropylene film. The biaxially oriented polypropylene film may be obtained by processing at least one of the following materials into a film shape. The materials are a homopolymer made of only a propylene monomer; a random copolymer in which propylene (main monomer) and a small amount of comonomer different from propylene are randomly copolymerized to form a homogeneous phase; and a block copolymer in which propylene (main monomer) and the above comonomer are copolymerized in a block manner or polymerized in a rubber state to form a heterogeneous phase. In the case of using the biaxially oriented polypropylene film, it is particularly preferable that the plane orientation coefficient ΔP obtained through a phase difference measurement method is in the range of 0.005 to 0.020. With this range, delamination can be prevented by cohesive force of the substrate. The plane orientation coefficient can be adjusted by, for example, biaxial stretching and the subsequent heat setting conditions.

The resin substrate 10 may include a layer selected from a homopolymer layer (film), a random copolymer layer (film) and a block copolymer layer (film), or may include a laminate of two or more of these layers. Further, the resin substrate 10 may include a laminate of a plurality of the same films.

The thickness of the resin substrate 10 is not particularly limited, and may be, for example, 3 to 200 μm or 6 to 30 μm. The thickness may be adjusted according to applications or required properties. The resin substrate 10 may contain at least one additive selected from a filler, an antistatic agent, a plasticizer, a lubricant, an antioxidant, and the like. At least one treatment selected from chemical treatment, solvent treatment, corona treatment, plasma treatment, and ozone treatment may be applied to the surface of the resin substrate 10.

The underlayer 20 is provided between the resin substrate 10 and the coating layer 30. When the resin substrate 10 has asperity or waviness on its surface by containing a filler, adhesion between the resin substrate 10 and the coating layer 30 is improved by providing the underlayer 20 therebetween.

The underlayer 20 contains an organic polymer as a main component, and may be referred to as a primer layer. The lamination strength of the laminated film 100 can be increased by providing the underlayer 20.

The content of the organic polymer in the underlayer 20 may be, for example, 70 mass % or more, or may be 80 mass % or more. Examples of the organic polymer include polyols having two or more hydroxyl groups at the polymer terminal, organosilane compounds such as a silane coupling agent and a hydrolysate thereof, reaction products (water-based polyurethane resins) obtained by a two-liquid reaction between the polyols and an isocyanate compound, and reaction products of the polyols and a silane coupling agent. These organic polymers may be used alone or in combination of two or more.

The polyol, for example, is at least one selected from acrylic polyol, polyvinyl acetal, polystyrene polyol, and polyurethane polyol. The acrylic polyol may be a polyol obtained by polymerizing an acrylic acid derivative monomer, or may be a polyol obtained by copolymerizing an acrylic acid derivative monomer with another monomer. Examples of the acrylic acid derivative monomer include ethyl methacrylate, hydroxyethyl methacrylate, hydroxypropyl methacrylate, and hydroxybutyl methacrylate. The monomer copolymerized with the acrylic acid derivative monomer may be styrene, or the like.

Examples of the silane coupling agent include vinyltrimethoxysilane, γ-chloropropylmethyldimethoxysilane, γ-chloropropyltrimethoxysilane, glycidoxypropyltrimethoxysilane, γ-methacryloxypropyltrimethoxysilane, and γ-methacryloxypropylmethyldimethoxysilane. The organosilane compound may be a hydrolysate of the aforementioned silane coupling agent. The organosilane compound may contain one alone, or two or more in combination of the aforementioned silane coupling agents and hydrolysates thereof. When the underlayer 20 contains a silane coupling agent or a hydrolysate thereof, these may be the same as or different from those contained in the coating layer 30.

The isocyanate compound has an effect of improving adhesion between the resin substrate 10 and the coating layer 30 by a urethane bond made by reaction with the polyol. That is, the isocyanate compound serves as a crosslinking agent or a curing agent. Examples of the isocyanate compound include monomers such as aromatic tolylene diisocyanate (TDI), aromatic diphenylmethane diisocyanate (MDI), aliphatic xylene diisocyanate (XDI), aliphatic hexamethylene diisocyanate (HMDI), and aliphatic isophorone diisocyanate (IPDI); polymers thereof; and derivatives thereof. The aforementioned isocyanate compounds may be used alone or in combination of two or more.

The underlayer 20 may contain at least one selected from polyethyleneimine and derivatives thereof, polyolefin emulsion, polyimide, melamine, phenol, and inorganic silica such as organically modified colloidal silica. The thickness of the underlayer 20 is not particularly limited, and may be, for example, 0.005 to 5 μm. The thickness may be adjusted according to applications or required properties.

The underlayer 20 can be formed by blending the aforementioned components in an organic solvent at an arbitrary ratio to prepare a mixed solution and then applying the prepared mixed solution onto one surface of the resin substrate 10. The mixed solution may contain a curing accelerator such as tertiary amine, an imidazole derivative, a metal salt compound of carboxylic acid, a quaternary ammonium salt, or a quaternary phosphonium salt; an antioxidant such as a phenol-based, sulfur-based, or phosphite-based antioxidant; a leveling agent; a flow adjuster; a catalyst; a crosslinking reaction accelerator; a filler; or the like.

The mixed solution can be applied onto the resin substrate 10 using a well-known printing method such as offset printing, gravure printing or silk screen printing, or a well-known coating method such as roll coating, knife edge coating or gravure coating. After coating, the applied mixed solution is heated to 50 to 200° C., for example, and dried and/or cured, thereby forming the underlayer 20.

The coating layer 30 contains a water-soluble polymer, at least one of a silane coupling agent and a hydrolysate thereof, at least one of a metal alkoxide and a hydrolysate thereof, and an inorganic layered compound. Since the coating layer 30 contains an inorganic layered compound, it has good oxygen barrier properties. The content of the inorganic layered compound in the coating layer 30 is, for example, 2 to 10 mass %. When the laminated film 100 includes the coating layer 30, oxygen permeability can be reduced. Thus, it possible to sufficiently suppress the deterioration of the contents of the packaging bag formed using the laminated film 100.

The water-soluble polymer is not particularly limited, and examples thereof include a polyvinyl alcohol-based polymer, an alcohol-based polymer such as starch/methyl cellulose/carboxymethyl cellulose, and an acrylic polyol-based polymer. From the viewpoint of further improving oxygen gas barrier properties, preferably, the water-soluble polymer contains a polyvinyl alcohol-based polymer. The number average molecular weight of the water-soluble polymer is, for example, 40,000 to 180,000. When the underlayer 20 contains a polyol, the polyol may be the same as or different from the water-soluble polymer contained in the coating layer 30.

The polyvinyl alcohol-based water-soluble polymer can be obtained, for example, by the saponification (including partial saponification) of polyvinyl acetate. The water-soluble polymer may be one in which several tens of percent of an acetic acid group remains, or may be one in which only a few percent of an acetic acid group remains.

The content of the water-soluble polymer in the coating layer 30 is, for example, 15 to 50 mass %. The lower limit of the content of the water-soluble polymer in the coating layer 30 may be 20 mass % from the viewpoint of further reducing oxygen permeability. The upper limit of the content of the water-soluble polymer in the coating layer 30 may be 45 mass % from the viewpoint of further reducing oxygen permeability.

Examples of the metal alkoxide and its hydrolysate contained in the coating layer 30 include compounds represented by the general formula M(OR)$_n$, such as tetraethoxysilane [Si(OC$_2$H$_5$)$_4$] and triisopropoxy aluminum [Al(OC$_3$H$_7$)$_3$], and hydrolysates thereof. These may be used alone or in combination of two or more.

The total content of the metal alkoxide and its hydrolysate in the coating layer 30 is, for example, 40 to 70 mass %. From the viewpoint of further reducing oxygen permeability, the lower limit of the total content of the metal alkoxide and its hydrolysate in the coating layer 30 may be 50 mass %. From the same viewpoint, the upper limit of the total content of the metal alkoxide and its hydrolysate in the coating layer 30 may be 65 mass %.

As the silane coupling agent and its hydrolysate contained in the coating layer 30, a silane coupling agent having an organic functional group may be suitable. Examples of the silane coupling agent and its hydrolysates include ethyltrimethoxysilane, vinyltrimethoxysilane, γ-chloropropylmethyldimethoxysilane, γ-chloropropyltrimethoxysilane, glycidoxypropyltrimethoxysilane, γ-methacryloxypropyltrimethoxysilane, γ-methacryloxypropylmethyl dimethoxysilane, and hydrolysates thereof. These may be used alone or in combination of two or more.

At least one of the silane coupling agent and its hydrolysate preferably has an epoxy group as the organic functional group. Examples of the silane coupling agent having an epoxy group include γ-glycidoxypropyltrimethoxysilane and β-(3,4-epoxycyclohexyl) ethyltrimethoxysilane. The silane coupling agent and its hydrolysate having an epoxy group may have an organic functional group such as a vinyl group, an amino group, a methacryl group or a ureyl group, which is different from the epoxy group.

The silane coupling agent having an organic functional group and its hydrolysate can further improve the oxygen barrier properties of the coating layer 30 and the adhesion between the coating layer 30 and the underlayer 20 by the interaction between its organic functional group and the hydroxyl group of the water-soluble polymer. In particular, it is possible to form the coating layer 30 having particularly good oxygen barrier properties and adhesion to the underlayer 20 by the interaction between the epoxy group of the silane coupling agent and its hydrolysate and the hydroxyl group of polyvinyl alcohol.

The total content of the silane coupling agent and its hydrolysate in the coating layer 30 is, for example, 1 to 15 mass %. From the viewpoint of further reducing oxygen permeability, the lower limit of the total content of the silane coupling agent and its hydrolysate in the coating layer 30 may be 2 mass %. From the same viewpoint, the upper limit of the total content of the silane coupling agent and its hydrolysate in the coating layer 30 may be 12 mass %.

From the viewpoint of further increasing lamination strength and further reducing oxygen permeability, the lower limit of the total content of the silane coupling agent and its hydrolysate in the coating layer 30 may be 3 mass %. The upper limit of the total content of the silane coupling agent and its hydrolysate in the coating layer 30 may be 10 mass %.

The inorganic layered compound contained in the coating layer 30 is a crystalline inorganic compound having a layered structure. Examples of the inorganic layered compound include clay minerals represented by the kaolinite group, smectite group, mica group, and the like. The coating layer 30 may contain one alone, or two or more in combination of these materials. The particle diameter of the inorganic layered compound is, for example, 0.1 to 10 μm. The aspect ratio of the inorganic layered compound is, for example, 50 to 5000.

Among the inorganic layered compounds, the clay minerals of the smectite group are preferable from the viewpoint of forming a composite coating film with an interlayer enlarged by the penetration of a water-soluble polymer or a metal alkoxide between layers having a layered structure. Specific examples of the clay minerals of the smectite group include montmorillonite, hectorite, and saponite. Among these, montmorillonite is more preferable from the viewpoint of stability and coatability of the mixed solution.

The content of the inorganic layered compound in the coating layer 30 is, for example, 2 to 10 mass % from the viewpoint of achieving both of good oxygen barrier properties and high lamination strength. From the viewpoint of further reducing oxygen permeability, the lower limit of the content of the inorganic layered compound in the coating layer 30 may be 2.5 mass %, or may be 3 mass %. From the viewpoint of enhancing lamination strength and/or moisture barrier properties, the upper limit of the content of the inorganic layered compound in the coating layer 30 may be 8 mass %, or may be 5 mass %.

The thickness of the coating layer 30 is not particularly limited, and may be, for example, 0.01 to 50 μm. The thickness may be adjusted according to applications or required properties. The coating layer 30 containing the aforementioned components can reduce the variation in lamination strength of the laminated film 100 even when the composition of the underlayer 20 is changed. Therefore, the degree of freedom in selecting the material of the underlayer 20 is increased, and the specification of the laminated film can be easily selected. In addition, since the lamination strength of the laminated film 100 can be stably increased, the laminated film 100 can be suitably used for a packaging bag required to have good sealing performance without providing a deposited thin film layer made of a metal oxide. From these viewpoints, it is preferable that the underlayer 20 and the coating layer 30 are in direct contact with each other.

The coating layer 30 can be formed by blending the aforementioned components in water or an organic solvent at an arbitrary ratio to prepare a mixed solution, applying the prepared mixed solution on the surface of the underlayer 20, followed by drying and curing. The mixed solution may contain other components within a range not significantly deteriorating the physical properties of the coating layer 30. Examples of such components include a dispersant, a stabilizer, a viscosity modifier, a colorant, and the like.

The mixed solution can be applied onto the underlayer 20 using a well-known printing method such as offset printing, gravure printing, or silk screen printing, or a well-known coating method such as roll coating, knife edge coating, or gravure coating. After coating, the applied mixed solution is heated to about 100° C., and dried and/or cured, thereby forming the coating layer 30.

The laminated film 100 has good oxygen barrier properties. That is, good oxygen barrier properties are secured even without having a deposited thin film layer made of an inorganic oxide or the like. Therefore, the laminated film 100 can be manufactured at lower manufacturing cost, as compared with a laminated film having a deposited thin film layer made of an inorganic oxide or the like. Such a laminated film 100 is particularly useful for applications which do not require so high moisture barrier properties. For example, the laminated film 100 can be particularly suitably used as a laminated film constituting a packaging bag for storing contents containing moisture.

Figure 2:
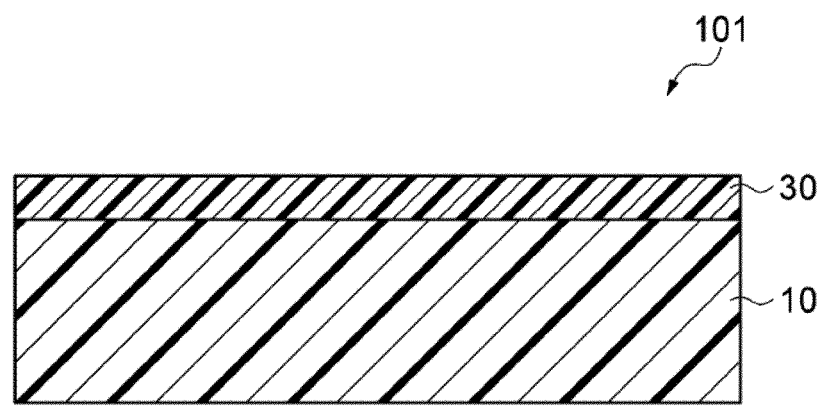
FIG. 2 is a schematic sectional view illustrating a modified example of the first embodiment of the laminated film.

FIG. 2 is a schematic sectional view of a laminated film according to a modified example of the first embodiment. A laminated film 101 includes a resin substrate 10 and a coating layer 30 provided on a surface of the resin substrate 10. The laminated film 101 is different from the laminated film 100 in that the underlayer 20 is not provided, and thus the resin substrate 10 and the coating layer 30 are in direct contact with each other. The rest of the configuration of the laminated film 101 is similar to the laminated film 100.

The laminated film 101 has good oxygen barrier properties. That is, good oxygen barrier properties are secured even without having a deposited thin film layer made of an inorganic oxide or the like and an underlayer. Therefore, the laminated film 101 can be manufactured at lower manufacturing cost, as compared with a laminated film having a deposited thin film layer made of an inorganic oxide or the like. Such a laminated film 101 is particularly useful for applications which do not require so high moisture barrier properties. For example, this laminated film 101 can be particularly suitably used as a laminated film constituting a packaging bag for storing contents containing moisture.

Figure 3:
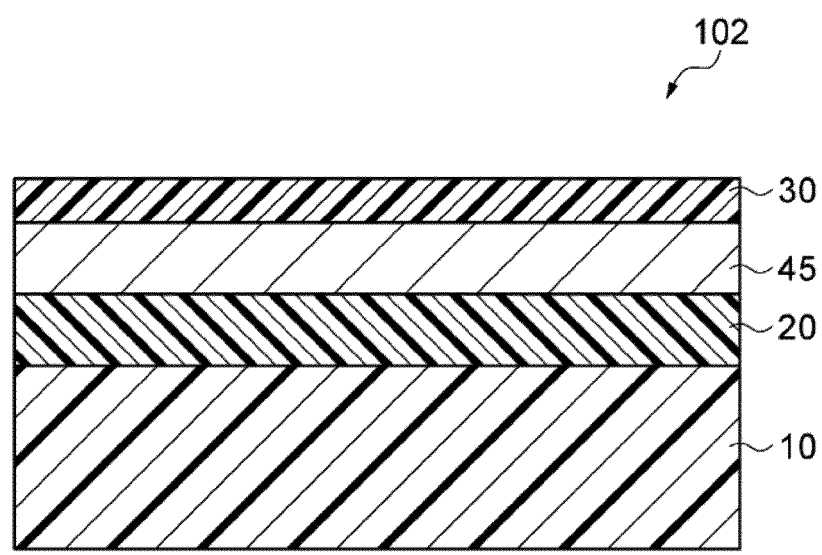
FIG. 3 is a schematic sectional view illustrating another modified example of the laminated film according to the first embodiment.

FIG. 3 is a schematic sectional view of a laminated film according to another modified example of the first embodiment. A laminated film 102 includes a resin substrate 10; and an underlayer 20, a deposited thin film layer 45 made of an inorganic oxide or the like, and a coating layer 30, which are formed in this order on a surface of the resin substrate 10.

That is, the laminated film 102 is different from the laminated film 100 in that the deposited thin film layer 45 is provided between the underlayer 20 and the coating layer 30. The rest of the configuration of the laminated film 102 is similar to the laminated film 100.

Being provided with the deposited thin film layer 45, the laminated film 102 has both good oxygen barrier properties and good moisture barrier properties. Therefore, the laminated film 102 is particularly useful for applications requiring not only oxygen barrier properties but also moisture barrier properties. For example, the laminated film 102 can be particularly suitably used as a laminated film constituting a packaging bag for storing contents containing little moisture.

The deposited thin film layer 45 contains, for example, aluminum oxide, silicon oxide, and magnesium oxide. The deposited thin film layer 45 may contain one alone, or two or more in combination of these oxides. The thickness of the deposited thin film layer 45 is, for example, 5 to 100 nm. When the thickness is less than 5 nm, good moisture barrier properties tend to be impaired. When the thickness exceeds 100 nm, cracks tend to occur in the deposited thin film layer 45 due to external force such as bending or tension. The deposited thin film layer 45 can be formed by, for example, vacuum vapor deposition, sputtering, ion plating, plasma-enhanced chemical vapor deposition (CVD), or the like.

The aforementioned laminated films 100, 101 and 102 all have good oxygen barrier properties. The oxygen permeation rate measured by the mocon method (isobaric method) according to JIS K 7126-2: 2006 may be, for example, 3 ml/m$^2$/day or less, or may be 2.5 ml/m$^2$/day or less. Further, the oxygen permeation rate may be, for example, 2 ml/m$^2$/day or less, or may be 1.5 ml/m$^2$/day or less. The oxygen permeation rate in this specification is measured under the conditions of 30° C. and 70% RH at atmospheric pressure.

The aforementioned laminated films 100, 101 and 102 may have good moisture barrier properties. The moisture permeation rate measured by the mocon method (isobaric method) according to JIS K 7129: 2008 may be, for example, 2 g/m$^2$/day or less, or may be 1.5 g/m$^2$/day or less. The moisture permeation rate in this specification is measured under the conditions of 40° C. and 90% RH at atmospheric pressure.

The lamination strength of the laminated films 100, 101 and 102 can be measured by a T-peel method (crosshead speed: 300 mm/min) using a Tensilon type universal material tester according to JIS Z 0238: 1998. The lamination strength of the laminated film 100 is, for example, 2 N/15 mm or more.

The coating layer 30 in the laminated films 100, 101 and 102 can be formed using a mixed solution containing an inorganic layered compound. When the mixed solution containing an inorganic layered compound is applied, asperity is formed on the surface of the coating layer 30 that does not impair the function of the laminated films 100, 101 and 102. Therefore, the surface area of the coating layer 30 increases, so that the mixed solution can be sufficiently rapidly dried at the time of forming the coating layer 30. In this way, since the coating layer 30 contains an inorganic layered compound, the productivity of the laminated films 100, 101 and 102 is enhanced. From this viewpoint, the $R_{sm}$ (average length of roughness curve elements) on the surface of the coating layer 30 may be less than 200 μm, or may be less than 150 μm. As Rsm decreases, the mixed solution is dried faster, and the productivity of the laminated film increases. $R_{sm}$ is measured within an arbitrarily selected measurement length of 1.885 mm using a noncontact surface/layer-sectional shape measuring instrument (VertScan [registered trademark], manufactured by Mitsubishi Chemical Systems, Inc.).

On the surface of the coating layer 30, the number of peaks having a height of 0.01 μm or more may be 200 or more, or may be 300 or more. With such a high peak number, the mixed solution is dried faster at the time of forming the coating layer 30. Therefore, the productivity of the laminated films 100, 101 and 102 can be further increased. The number of peaks can be obtained by counting the protrusions having a height of 0.01 μm or more in the arbitrarily selected area of 2.5 mm$^2$ in an observed cross section, using the noncontact surface/layer-sectional shape measuring instrument.

The laminated films 100, 101 and 102 may be transparent or translucent. The "translucent" in this specification means that part of visible light is not transmitted through the laminated film when the laminated film is irradiated with visible light. The laminated films 100, 101 and 102 do not have to necessarily transmit part of visible light, but may scatter visible light to some extent.

The laminated films 100, 101 and 102 may each have a heat seal layer on the coating layer 30. The heat seal layer serves as a bonding portion at the time of forming a packaging bag. Examples of constituents of the heat seal layer include resins, such as polyethylene, polypropylene, an ethylene-vinyl acetate copolymer, an ethylene-methacrylic acid copolymer, an ethylene-methacrylic acid ester copolymer, an ethylene-acrylic acid copolymer, an ethylene-acrylic acid ester copolymer, and metal crosslinked products thereof. The thickness of the heat seal layer is, for example, 15 to 200 μm. Depending on the application, a heat seal layer may be provided on the other surface of the resin substrate 10 (the surface on a side opposite to the coating layer 30 side).

As the method of forming the heat seal layer, mention can be made of a dry lamination method of bonding a film made of the aforementioned resin using a two-part curable urethane adhesive, a non-solvent dry lamination method of bonding the film using a solventless adhesive, and an extrusion lamination method of heating and melting the aforementioned resin, and extruding the molten resin into a curtain film, followed by bonding.

A buffer layer containing at least one of oriented nylon, oriented polyester, oriented polypropylene, and the like may be provided between the heat seal layer and the coating layer 30. Further, if necessary, a printed layer may be laminated on the coating layer 30, or a plurality of resin layers may also be laminated on the coating layer 30 through an adhesive. Furthermore, a printed layer or a heat seal layer may also be provided on the other surface of the resin substrate 10, or a plurality of resin layers may be provided on the other surface using an adhesive.

Second Embodiment

Figure 4:
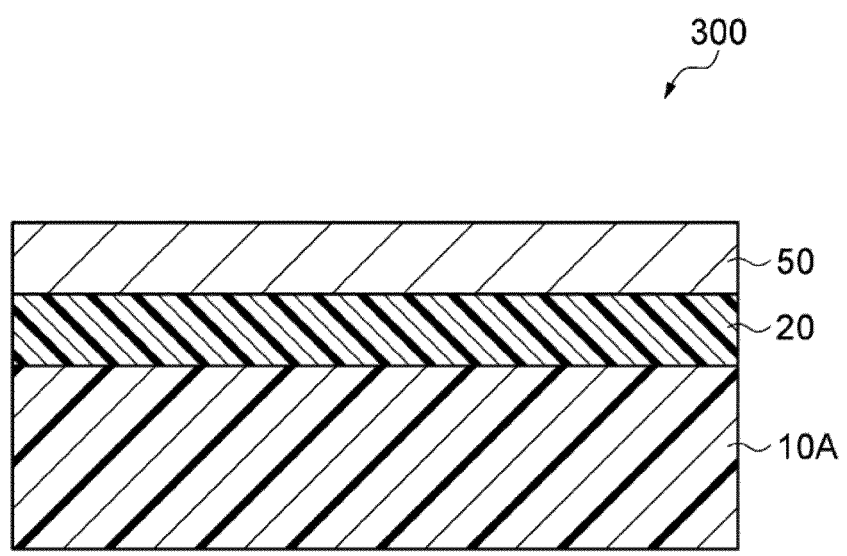
FIG. 4 is a schematic sectional view illustrating a second embodiment of a laminated film.

FIG. 4 is a schematic sectional view of a laminated film according to a second embodiment. A laminated film 300 includes a film-like resin substrate 10A; and an underlayer 20 and a deposited thin film layer 50 formed in this order on a surface of the resin substrate 10A. That is, the underlayer 20 is provided between the resin substrate 10A and the deposited thin film layer 50.

The resin substrate 10A has a biaxially oriented polypropylene film. When the resin substrate 10A has a biaxially oriented polypropylene film, gas barrier properties such as oxygen barrier properties and moisture barrier properties are improved. The biaxially oriented polypropylene film may be obtained by processing at least one of the following materials into a film shape. The materials are a homopolymer made of only a propylene monomer, a random copolymer in which propylene (main monomer) and a small amount of comonomer different from propylene are randomly copolymerized to form a homogeneous phase, and a block copolymer in which propylene (main monomer) and the above comonomer are copolymerized in a block manner or copolymerized in a rubber state to form a heterogeneous phase. In the case of using the biaxially oriented polypropylene film, it is particularly preferable that the plane orientation coefficient ΔP by a phase difference measurement method is in the range of 0.005 to 0.020. The surface layer can be prevented from being peeled off by cohesive force of the substrate. The plane orientation coefficient can be adjusted by, for example, biaxial stretching and conditions of the subsequent heat setting.

The resin substrate 10A may include a layer selected from a homopolymer layer (film), a random copolymer layer (film), and a block copolymer layer (film), or may include a laminate of two or more of these layers. Further, the resin substrate 10A may include a laminate of a plurality of the same films.

The resin substrate 10A may be one in which another resin film is laminated on the biaxially oriented polypropylene film. Examples of the resin film include polyester films such as of polyethylene terephthalate (PET) and polyethylene naphthalate (PEN); polyolefin films such as of polyethylene; polystyrene films; polyamide films such as of 66-nylon; polycarbonate films; and engineering plastic films, such as a polyacrylonitrile film or a polyimide film.

The thickness of the resin substrate 10A is not particularly limited, and may be, for example, 3 to 200 μm, or may be 6 to 30 μm. The thickness may be adjusted according to applications or required properties. The resin substrate 10A may contain at least one additive selected from a filler, an antistatic agent, a plasticizer, a lubricant, and an antioxidant. At least one treatment selected from chemical treatment, solvent treatment, corona treatment, plasma treatment, and ozone treatment may be applied to the surface of the resin substrate 10A.

The underlayer 20 is provided between the resin substrate 10A and the deposited thin film layer 50. Even when the resin substrate 10A has asperity or waviness on its surface by containing a filler, the adhesion between the resin substrate 10A and the deposited thin film layer 50 is improved by providing the underlayer 20.

The underlayer 20 contains an organic polymer as a main component, and may be referred to as a primer layer. The content of the organic polymer in the underlayer 20 may be, for example, 70 mass % or more, or may be 80 mass % or more. Examples of the organic polymer include polyols having two or more hydroxyl groups at the polymer terminal, organosilane compounds such as a silane coupling agent and hydrolysates thereof, reaction products (water-based polyurethane resins) obtained by a two-liquid reaction of an aforementioned polyol and an isocyanate compound, and reaction products of an aforementioned polyol and the silane coupling agent. These organic polymers may be used alone or in combination of two or more.

The polyol, for example, is at least one selected from an acrylic polyol, polyvinyl acetal, polystyrene polyol, polyurethane polyol, and the like. The acrylic polyol may be a polyol obtained by polymerizing an acrylic acid derivative monomer, or may be a polyol obtained by copolymerizing an acrylic acid derivative monomer with another monomer. Examples of the acrylic acid derivative monomer include ethyl methacrylate, hydroxyethyl methacrylate, hydroxypropyl methacrylate, and hydroxybutyl methacrylate. The monomer copolymerized with the acrylic acid derivative monomer may be styrene, or the like.

Examples of the silane coupling agent include vinyltrimethoxysilane, γ-chloropropylmethyldimethoxysilane, γ-chloropropyltrimethoxysilane, glycidoxypropyltrimethoxysilane, γ-methacryloxypropyltrimethoxysilane, and γ-methacryloxypropylmethyldimethoxysilane. The organosilane compound may be a hydrolysate of the aforementioned silane coupling agent. The organosilane compound may contain one alone, or two or more in combination of the aforementioned silane coupling agents and hydrolysates thereof.

The isocyanate compound has an effect of improving adhesion between the resin substrate 10A and the deposited thin film layer 50 by a urethane bond caused by reaction with the polyol. That is, the isocyanate compound serves as a crosslinking agent or a curing agent. Examples of the isocyanate compound include monomers such as aromatic tolylene diisocyanate (TDI), aromatic diphenylmethane diisocyanate (MDI), aliphatic xylene diisocyanate (XDI), aliphatic hexamethylene diisocyanate (HMDI), and aliphatic isophorone diisocyanate (IPDI); polymers thereof; and derivatives thereof. The aforementioned isocyanate compounds may be used alone or in combination of two or more.

The underlayer 20 may contain at least one selected from polyethyleneimine and derivatives thereof, polyolefin emulsion, polyimide, melamine, phenol, and inorganic silica such as organically modified colloidal silica.

The thickness of the underlayer 20 is not particularly limited, and may be, for example, 0.005 to 5 μm. The thickness may be adjusted according to applications or required properties.

The underlayer 20 can be formed by blending the aforementioned components in an organic solvent at an arbitrary ratio to prepare a mixed solution and then applying the prepared mixed solution onto a surface of the resin substrate 10A. The mixed solution may contain, in addition to the aforementioned organic polymer, a curing accelerator such as tertiary amine, an imidazole derivative, a metal salt compound of carboxylic acid, a quaternary ammonium salt, or a quaternary phosphonium salt; an antioxidant such as a phenol-based, sulfur-based, or phosphite-based antioxidant; a leveling agent; a flow adjuster; a catalyst; a crosslinking reaction accelerator; a filler; or the like.

The mixed solution can be applied onto the resin substrate 10A using a well-known printing method such as offset printing, gravure printing or silk screen printing, or a well-known coating method such as roll coating, knife edge coating or gravure coating. After coating, the applied mixed solution is heated to 50 to 200° C., for example, and dried and/or cured, thereby forming the underlayer 20.

The deposited thin film layer 50 contains a silicon oxide [$SiO_x$ (x is about 2)]. The thickness of the deposited thin film layer 50 is, for example, 5 to 100 nm. The laminated film 300 having the deposited thin film layer 50 of such a thickness has both excellent moisture barrier properties and high flexibility and transparency. The deposited thin film layer 50 can be formed on the underlayer 20 by, for example, vacuum vapor deposition, sputtering, ion plating, plasma-enhanced chemical vapor deposition (CVD), or the like.

The laminated film 300 is provided with the deposited thin film layer 50 containing silicon oxide, on the resin substrate 10A having good gas barrier properties. The deposited thin film layer 50 containing silicon oxide has good moisture barrier properties as compared with a deposited thin film layer containing an oxide, such as aluminum oxide or magnesium oxide, instead of silicon oxide. Since the underlayer 20 is provided between the deposited thin film layer 50 and the resin substrate 10A, the deposited thin film layer 50 and the resin substrate 10A have good adhesiveness. In this way, due to the synergistic effect of having the deposited thin film layer 50 and the resin substrate 10A with good moisture barrier properties and the adhesiveness thereof being good, the laminated film 300 has excellent moisture barrier properties. Therefore, the laminated film 300 is particularly useful in applications requiring high moisture barrier properties. For example, contents of a packaging bag can be sufficiently prevented from being deteriorated by using the laminated film 300 for the packaging bag.

Figure 5:
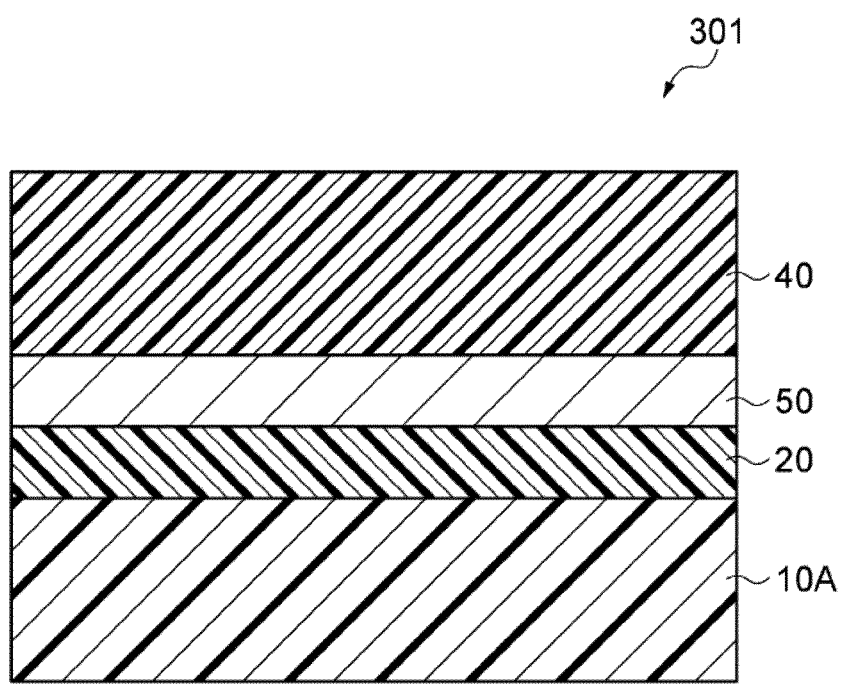
FIG. 5 is a schematic sectional view illustrating a modified example of the second embodiment of the laminated film.

FIG. 5 is a schematic sectional view of a laminated film according to a modified example of the second embodiment. A laminated film 301 includes a resin substrate 10A; and an underlayer 20, a deposited thin film layer 50, and a coating layer 40, which are formed in this order on a surface of the resin substrate 10A. That is, the laminated film 301 is different from the laminated film 300 in that the coating layer 40 is provided to the deposited thin film layer 50 on a side opposite to the underlayer 20 side. The rest of the configuration of the laminated film 301 is similar to the laminated film 300.

The coating layer 40 contains, for example, a water-soluble polymer, at least one of a silane coupling agent and a hydrolysate thereof, at least one of a metal alkoxide and a hydrolysate thereof, and an inorganic layered compound. The content of the inorganic layered compound in the coating layer 40 is, for example, 2 to 10 mass %. The coating layer 40 has good moisture barrier properties and oxygen barrier properties. Thus, the contents of the packaging bag formed of the laminated film 301 are sufficiently prevented from being deteriorated.

The water-soluble polymer is not particularly limited, and examples thereof include a polyvinyl alcohol-based polymer, an alcohol-based polymer such as starch/methyl cellulose/carboxymethyl cellulose, and an acrylic polyol-based polymer. From the viewpoint of further improving oxygen gas barrier properties, preferably, the water-soluble polymer contains a polyvinyl alcohol-based polymer. The number average molecular weight of the water-soluble polymer is, for example, 40,000 to 180,000.

The polyvinyl alcohol-based water-soluble polymer can be obtained, for example, by the saponification (including partial saponification) of polyvinyl acetate. The water-soluble polymer may be one in which several tens of percent of acetic acid group remains, or may be one in which only a few percent of acetic acid group remains.

The content of the water-soluble polymer in the coating layer 40 is, for example, 15 to 50 mass %. The lower limit of the content of the water-soluble polymer in the coating layer 40 may be 20 mass % from the viewpoint of further reducing moisture permeability and oxygen permeability. The upper limit of the content of the water-soluble polymer in the coating layer 40 may be 45 mass % from the viewpoint of further reducing water vapor permeability and oxygen permeability.

Examples of the metal alkoxide and its hydrolysate contained in the coating layer 40 include compounds represented by the general formula M(OR)$_n$, such as tetraethoxysilane [Si(OC$_2$H$_5$)$_4$] and triisopropoxy aluminum [Al(OC$_3$H$_7$)$_3$], and hydrolysates thereof. These may be used alone or in combination of two or more.

The total content of the metal alkoxide and its hydrolysate in the coating layer 40 is, for example, 40 to 70 mass %. From the viewpoint of further reducing oxygen permeability, the lower limit of the total content of the metal alkoxide and its hydrolysate in the coating layer 40 may be 50 mass %. From the same viewpoint, the upper limit of the total content of the metal alkoxide and its hydrolysate in the coating layer 40 may be 65 mass %.

As the silane coupling agent and its hydrolysate contained in the coating layer 40, a silane coupling agent having an organic functional group can be mentioned. Examples of the silane coupling agent include ethyltrimethoxysilane, vinyltrimethoxysilane, γ-chloropropylmethyldimethoxysilane, γ-chloropropyltrimethoxysilane, glycidoxypropyltrimethoxysilane, γ-methacryloxypropyltrimethoxysilane, γ-methacryloxypropylmethyl dimethoxysilane, and hydrolysates thereof. These may be used alone or in combination of two or more. The silane coupling agent contained in the coating layer 40 may be the same as or different from the silane coupling agent contained in the underlayer 20.

At least one of the silane coupling agent and its hydrolysate preferably has an epoxy group as the organic functional group. Examples of the silane coupling agent having an epoxy group include γ-glycidoxypropyltrimethoxysilane and β-(3,4-epoxycyclohexyl)ethyltrimethoxysilane. The silane coupling agent and its hydrolysate having an epoxy group may have an organic functional group such as a vinyl group, an amino group, a methacryl group or a ureyl group, which is different from the epoxy group.

The silane coupling agent having an organic functional group and its hydrolysate can further improve the oxygen barrier properties of the coating layer 40 by the interaction between its organic functional group and the hydroxyl group of the water-soluble polymer. In particular, the epoxy group of the silane coupling agent and its hydrolysate interacts with the hydroxyl group of polyvinyl alcohol to thereby form the coating layer 40 having particularly good oxygen barrier properties.

The total content of the silane coupling agent and its hydrolysate in the coating layer 40 is, for example, 1 to 15 mass %. From the viewpoint of further reducing oxygen permeability, the lower limit of the total content of the silane coupling agent and its hydrolysate in the coating layer 40 may be 2 mass %. From the same viewpoint, the upper limit of the total content of the silane coupling agent and its hydrolysate in the coating layer 40 may be 12 mass %.

The inorganic layered compound contained in the coating layer 40 is a crystalline inorganic compound having a layered structure. Examples of the inorganic layered compound include clay minerals represented by kaolinite group, smectite group, mica group, and the like. The coating layer 40 may contain one alone, or two or more in combination of these inorganic layered compounds. The particle diameter of the inorganic layered compound is, for example, 0.1 to 10 μm. The aspect ratio of the inorganic layered compound is, for example, 50 to 5000.

Among the inorganic layered compounds, the clay minerals of the smectite group are preferable from the viewpoint of forming a composite coating film with an interlayer enlarged by the penetration of a water-soluble polymer or a metal alkoxide between layers of a layered structure. Specific examples of the clay minerals of the smectite include montmorillonite, hectorite, and saponite. Among these, montmorillonite is more preferable from the viewpoint of stability and coatability of the mixed solution.

The content of the inorganic layered compound in the coating layer 40 is 2 to 10 mass %. From the viewpoint of further reducing oxygen permeability, the lower limit of the content of the inorganic layered compound in the coating layer 40 may be 2.5 mass %, or may be 3 mass %. From the viewpoint of increasing moisture barrier properties, the upper limit of the content of the inorganic layered compound in the coating layer 40 may be 8 mass %, or may be 5 mass %.

The thickness of the coating layer 40 is not particularly limited, and may be, for example, 0.01 to 50 μm. The thickness may be adjusted according to applications or required properties.

The coating layer 40 can be formed by blending the aforementioned components in water or an organic solvent at an arbitrary ratio to prepare a mixed solution and applying the prepared mixed solution on the surface of the deposited thin film layer 50. The mixed solution may contain other components within a range not significantly deteriorating the physical properties of the coating layer 40. Examples of such components include a dispersant, a stabilizer, a viscosity modifier, and a colorant.

The mixed solution can be applied onto the deposited thin film layer 50 using a well-known printing method such as offset printing, gravure printing, or silk screen printing, or a well-known coating method such as roll coating, knife edge coating, or gravure coating. After coating, the applied mixed solution is heated to about 100° C., and dried and/or cured, thereby forming the coating layer 40.

Since the laminated film 301 has the coating layer 40, the laminated film 301 has very good moisture barrier properties, and also has good oxygen barrier properties. Therefore, the laminated film 301 is quite useful in that freshness date can be extended in food packaging applications, for example. In addition, the laminated film 301 is quite useful in that distortion of a door material or the like by moisture can be suppressed in building material applications.

Both of the laminated films 300 and 301 have good moisture barrier properties. The moisture permeation rate measured by the mocon method (isobaric method) according to JIS K 7129: 2008 may be, for example, 2 $g/m^2/day$ or less, or may be 1.5 $g/m^2/day$ or less. The moisture permeation rate in this specification is measured under the conditions of 40° C. and 90% RH at atmospheric pressure.

The laminated films 300 and 301 may have good oxygen barrier properties in addition to good moisture barrier properties. The oxygen permeation rate measured by the mocon method (isobaric method) according to JIS K 7126-2: 2006 may be, for example, 1 $ml/m^2/day$ or less, or may be 0.5 $ml/m^2/day$ or less. The oxygen permeation rate in this specification is measured under the conditions of 30° C. and 70% RH at atmospheric pressure.

The lamination strength of the laminated films 300 and 301 can be measured by a T-peel method (crosshead speed: 300 mm/min) using a Tensilon type universal material tester according to JIS Z 0238: 1998. The lamination strength of each of the laminated films 300 and 301 is, for example, 2 N/15 mm or more.

The laminated films 300 and 301 may be transparent or translucent. The "translucent" in this specification means that part of visible light is not transmitted through the laminated film when the laminated film is irradiated with visible light. The laminated films 300 and 301 do not have to necessarily transmit a part of visible light, and may scatter visible light to some extent.

The laminated film 300 may have a heat seal layer on the deposited thin film layer 50. The laminated film 301 may have a heat seal layer on the coating layer 40. The heat seal layer serves as a bonding portion at the time of forming a packaging bag. Examples of constituents of the heat seal layer include resins, such as polyethylene, polypropylene, an ethylene-vinyl acetate copolymer, an ethylene-methacrylic acid copolymer, an ethylene-methacrylic acid ester copolymer, an ethylene-acrylic acid copolymer, ethylene-acrylic acid ester copolymer, and metal crosslinked products thereof. The thickness of the heat seal layer is, for example, 15 to 200 μm. Depending on the application, a heat seal layer may be provided on the other surface of the resin substrate 10A (the surface on a side opposite to the deposited thin film layer 50 side or the coating layer 40 side).

As the method of forming the heat seal layer, mention can be made of a dry lamination method of bonding a film made of the aforementioned resin using a two-part curable urethane adhesive, a non-solvent dry lamination method of bonding the film using a solventless adhesive, and an extrusion lamination method of heating and melting the aforementioned resin, extruding the molten resin into a curtain film and then bonding the curtain film.

A buffer layer containing at least one of oriented nylon, oriented polyester, and oriented polypropylene may be provided between the heat seal layer and the deposited thin film layer 50 or between the heat seal layer and the coating layer 40. Further, if necessary, on the deposited thin film layer 50 or the coating layer 40, a printed layer may be laminated, or a plurality of resin layers may be laminated through an adhesive. Furthermore, a printed layer or a heat seal layer may also be provided on the other surface of the resin substrate 10A, or a plurality of resin layers may be provided using an adhesive.

<Packaging Bag>

Figure 6:
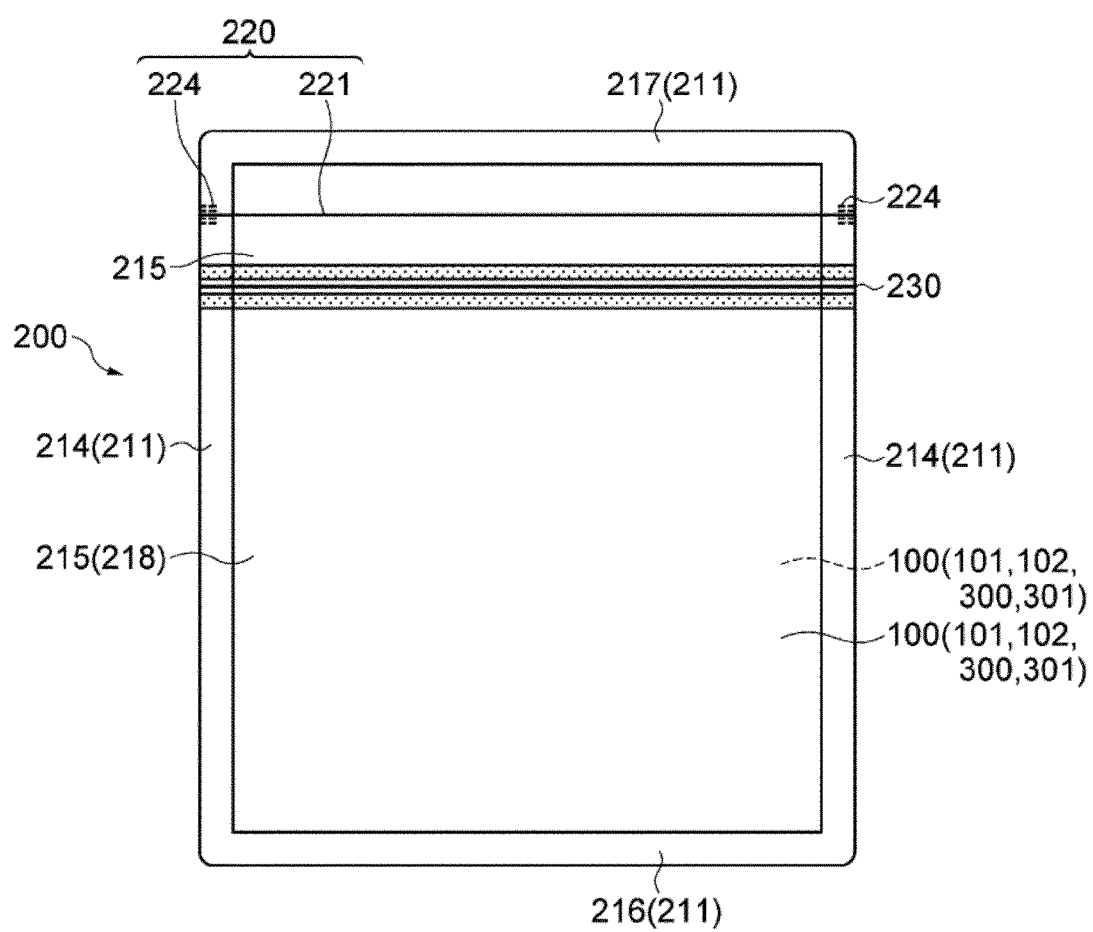
FIG. 6 is a schematic sectional view illustrating an embodiment of a packaging bag.

FIG. 6 is a plan view illustrating an embodiment of a packaging bag formed using a laminated film. A packaging bag 200 includes a sealing region 211 formed by bonding the peripheral edges of a pair of substantially rectangular laminated films 100 (300), and a storage region 218 formed between the pair of laminated films 100, 100 by the sealing region 211. That is, in the packaging bag 200, a side end portion 214, a lower end portion 216, and an upper end portion 217 are sealed by the sealing region 211. In the packaging bag 200, a non-sealing region (sheet region) 215 surrounded by the sealing region 211 is provided with the storage region 218 in which an object to be packaged, such as foodstuffs, is stored. An object to be packaged, such as foodstuffs, is stored in the storage region 218. The sealing region 211 of the lower end portion 216 may be sealed after filling the storage region 218 with an object to be packaged.

The pair of laminated films 100 (300) are stacked so that the coating layers 30 (deposited thin film layers 50) face each other. The pair of laminated films 100 (300) may be adhered to each other by an adhesive in the sealing region 211. The pair of laminated films 100 (300) may constitute the sealing region 211 by adhering the heat seal layers provided on the respective coating layers 30 (deposited thin film layers 50).

Since the laminated film 100 (300) has good oxygen gas barrier properties and/or moisture barrier properties, these oxygen or moisture barrier properties contribute to sufficiently preventing deterioration of an object to be packaged that is stored in the storage region 218. The packaging bag 200 may be provided with the laminated film 101 or the laminated film 102 in place of the laminated film 100. The packaging bag 200 may be provided with the laminated film 301 in place of the laminated film 300. In this case as well, the object to be packaged that is stored in the storage region 218 is sufficiently prevented from being deteriorated by oxygen or moisture. An arbitrary layer may be provided on the resin substrate 10 and the coating layer 30 of the laminated film 100 (101, 102). An arbitrary layer may be provided on the resin substrate 10A and the deposited thin film layer 50 (coating layer 40) of the laminated film 300 (301).

A procedure for manufacturing the packaging bag 200 using the laminated film 100 (300) will be described below. A pair of laminated films 100 (300) are used. In the case of the laminated film 100, the coating layers 30 of the laminated film 100, or the heat seal layers provided on the coating layers 30 are permitted to face each other, and the coating layers 30 or the heat seal layers are bonded to each other in a state where, for example, a fastener tape serving as a resealing means 230 is sandwiched therebetween. In the case of the laminated film 300, the deposited thin film layers 50 of the laminated film 300, or the heat seal layers provided on the deposited thin film layers 50 are permitted to face each other, and the deposited thin film layers 50 or the heat seal layers are bonded to each other in a state where, for example, a fastener tape serving as the resealing means 230 is sandwiched therebetween. Thus, the sealing region 211 is formed at a position corresponding to the upper end portion 217 and the side end portions 214, 214, thereby forming the non-sealing region 215 surrounded in a U shape by the sealing region 211.

After forming the sealing region 211, an opening means 220 may be formed. For example, easy opening processing portions 224, 224 composed of scars are formed on the respective side end portions 214, 214. The easy opening processing portion 224 is not limited to scars, but may be a V-, U- or I-shaped notch. In addition, a half-cut line 221 serving as a cutting and opening guide may be formed from the easy opening processing portion 224, so as to be located between the upper end portion 217 and the resealing means 230 of the surface portion of the laminated film 100 (300). The half-cut line 221 can be formed using a laser. After forming the opening means 220, the laminated films 100 (300) are decoratively cut in the sealing region 211, and divided into individual packaging bags.

Next, the object to be packaged is charged into each packaging bag from the unsealed lower end portion 216. Thereafter, the laminated films 100 (300) are bonded to each other at the lower end portion 216, and thus the sealing region 211 is also formed at the lower end portion 216. In this way, the packaging bag 200 can be manufactured. The half-cut line may be formed before slitting the pair of bonded films 100 (300) to a predetermined width. Also, in the case of using the laminated films 101, 102 (301) in place of the laminated film 100 (300), the packaging bag 200 can be manufactured in the same manner.

The packaging bag 200 includes the opening means 220, on the upper end side of the non-sealing region 215, for cutting and opening the side end portions 214, 214 of the packaging bag 200 so as to cross the space therebetween, and the resealing means 230, on the lower side of the opening means 220, for resealing the storage region 218 after being opened by the opening means 220. The resealing means 230 may appropriately employ a known structure capable of repeated opening and sealing. For example, the resealing means 230 may be a fastener made of a synthetic resin that can be repeatedly sealed by fitting a strip-shaped protrusion to a strip-shaped groove, or may be an adhesive seal.

Heretofore, some embodiments of the present invention have been described, but the present invention is not limited to these embodiments. For example, in the laminated film 100 (101, 102), an arbitrary layer or a thin film may be provided between the resin substrate 10 and the underlayer 20, between the underlayer 20 and the coating layer 30 or the deposited thin film layer 45, or between the coating layer 30 and the deposited thin film layer 45 within the range of not greatly impairing the function of the laminated film. In the laminated film 300 (301), an arbitrary layer or a thin film may be provided between the resin substrate 10 and the underlayer 20, between the underlayer 20 and the deposited thin film layer 50, or between the deposited thin film layer 50 and the coating layer 40 within the range of not greatly impairing the function of the laminated film. The shape of the packaging bag 200 is not limited to a four-sided bag. For example, the shape of the packaging bag 200 may be a two-sided bag, a three-sided bag, or a back-sealed bag, or may be a standing pouch shape provided with a bottom tape.

EXAMPLES

The present invention will be described in more detail with reference to Examples and Comparative Examples, but the present invention is not limited to the following examples.

Example 1-1

As a mixed solution for forming an underlayer, γ-isocyanatepropyltrimethylsilane, acrylic polyol, and aliphatic xylene diisocyanate were blended in a dilution solvent (ethyl acetate) at a mass ratio of 11:53:37 to prepare a mixed solution A (solid content: 2 mass %). The mixed solution A was applied onto a surface of a biaxially oriented polypropylene film, prepared as a resin substrate, by gravure coating. Then, the applied mixed solution A was dried to form an underlayer on the surface of the biaxially oriented polypropylene film. The biaxially oriented polypropylene film used was a commercially available product (trade name: PJ 201, thickness: 20 μm, plane orientation coefficient: 0.011, manufactured by A.J. Plast Public Company Limited) composed of a homopolymer type polypropylene film and a copolymer type polypropylene film.

Four components of polyvinyl alcohol (PVA, number average molecular weight: 75000), γ-glycidoxypropyltrimethoxysilane (GPTMS), tetraethoxysilane (TEOS), and montmorillonite (Mon.) were blended in water at a mass ratio shown in Table 1 to prepare a mixed solution B. The mixed solution B was applied onto the underlayer by gravure coating. Then, the applied mixed solution B was heated and dried to form a coating layer on the underlayer. In this way, a laminated film of Example 1-1 was fabricated. The thickness of the underlayer of the laminated film was about 60 to 70 nm, and the thickness of the coating layer of the laminated film was about 0.4 to 0.6 μm.

The $R_{sm}$ (average length of roughness curve elements) of the surface of the coating layer of the laminated film was measured using a noncontact surface/layer-sectional shape measuring instrument (VertScan [registered trademark], manufactured by Mitsubishi Chemical Systems Inc.). $R_{sm}$ is a value measured in a range of an arbitrarily selected measurement length 1.885 mm along the x direction. $R_{sm}$ was as shown in Table 1. The number of peaks in Table 1 was obtained by counting protrusions having a height of 0.01 μm or more in an arbitrarily selected area of 2.5 mm$^2$.

An unstretched polypropylene film was bonded by dry lamination to the coating layer of the laminated film via a two-part curable urethane adhesive to fabricate a film for evaluation. The oxygen permeation rate of the obtained film for evaluation was measured using an oxygen permeability measurement apparatus (apparatus name: OXTRAN 2/21, manufactured by MOCON Inc.). The measurement atmosphere was 30° C. and 70% RH. The measurement results are shown in Table 1.

Examples 1-2 to 1-8 and Comparative Example 1-1

Figure 7:
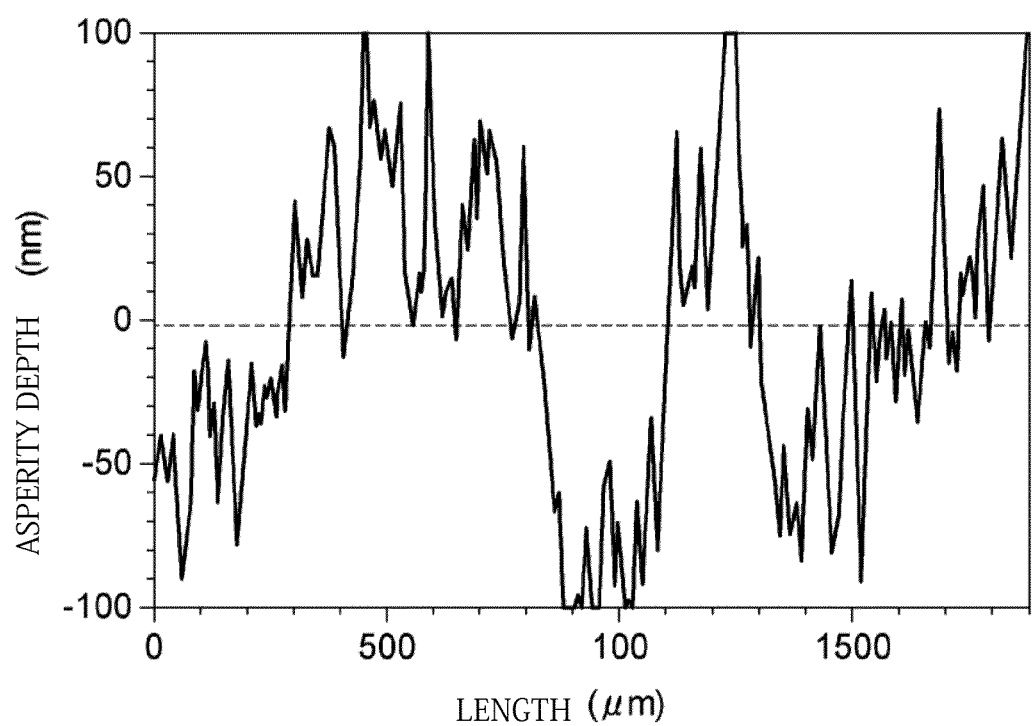
FIG. 7 is a graph illustrating the asperity in the x direction on the surface of a coating layer in the laminated films of Examples 1 to 3.
Figure 8:
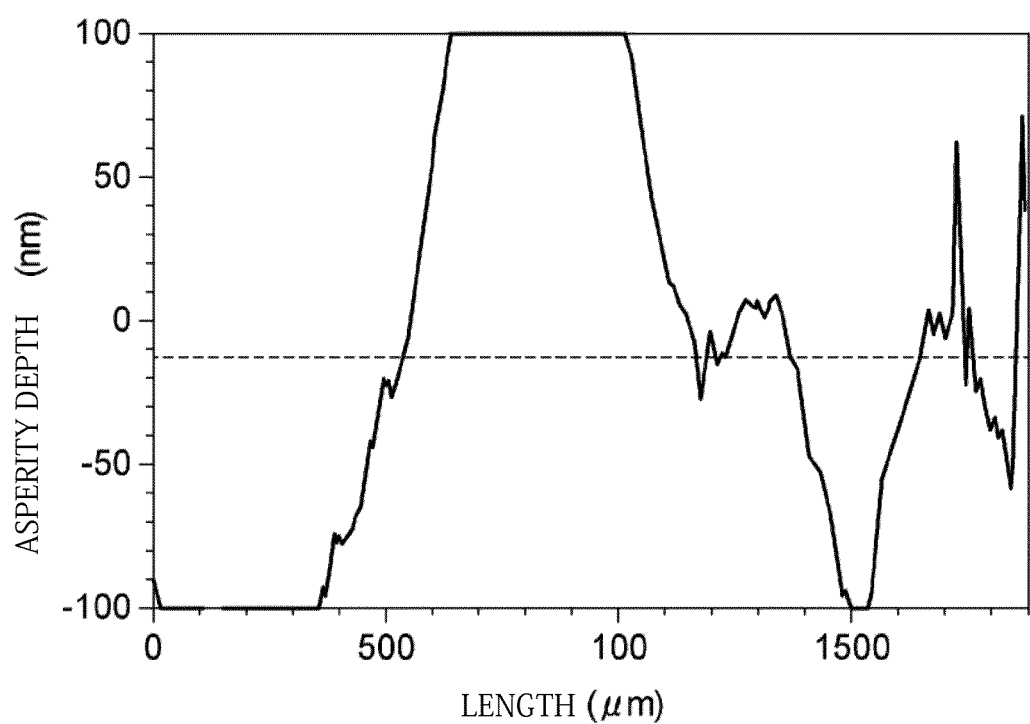
FIG. 8 is a graph illustrating the asperity in the x direction on the surface of a coating layer in the laminated films of Examples 1 to 8.

Laminated films were formed in the same manner as in Example 1-1, except that the mass ratios of polyvinyl alcohol, γ-glycidoxypropyltrimethoxysilane, tetraethoxysilane, and montmorillonite in the mixed solution B were changed as shown in Table 1. Each of the laminated films was evaluated in the same manner as in Example 1-1. The results are shown in Table 1. FIG. 7 is an example of a graph showing the asperity of the surface of the coating layer of Example 1-3 in the x direction. FIG. 8 is an example of a graph showing the asperity of the surface of the laminated film of Example 1-8 in the x direction.

TABLE 1

| No. | Composition of coating layer (mass %) | | | | Oxygen permeation rate (ml/m²/day) | Number of peaks | Rsm (μm) |
|---|---|---|---|---|---|---|---|
| | PVA | GPTMS | TEOS | Mon. | | | |
| Example 1-1 | 35 | 5 | 58 | 2 | 3.27 | 337 | 112 |
| Example 1-2 | 35 | 5 | 57 | 3 | 1.49 | 449 | 113 |
| Example 1-3 | 35 | 5 | 56 | 4 | 1.48 | 484 | 95 |
| Example 1-4 | 35 | 5 | 55 | 5 | 1.16 | 492 | 100 |
| Example 1-5 | 35 | 3 | 59 | 3 | 2.10 | — | — |
| Example 1-6 | 35 | 7 | 55 | 3 | 1.49 | — | — |
| Example 1-7 | 35 | 10 | 52 | 3 | 1.13 | — | — |
| Example 1-8 | 35 | 5 | 59 | 1 | 8.25 | 188 | 408 |
| Comparative Example 1-1 | 35 | 0 | 62 | 3 | 3.72 | 459 | 122 |

As shown in Table 1, it was confirmed that the laminated films of Examples 1-1 to 1-8 had good oxygen barrier properties. In Example 1-8 where the content of an inorganic layered compound was small, the oxygen permeation rate was higher than that in other examples. Where the content of the inorganic layered compound was the same, the laminated film having the coating layer containing a silane coupling agent had a lower oxygen permeation rate than the laminated film having the coating layer containing no silane coupling agent. The laminated film of Comparative Example 1-1 containing no silane coupling agent had a higher oxygen permeation rate than the laminated films of Examples.

Example 1-9

An aqueous polyurethane resin emulsion (trade name: WS 5000, manufactured by Mitsui Takeda Chemicals, Inc.) was prepared as a mixed solution for forming an underlayer. A laminated film was formed in the same manner as in Example 1-2, except that the aqueous polyurethane resin emulsion was used instead of the mixed solution A. The laminated film was evaluated in the same manner as in Example 1-2. The results are shown in Table 2.

Example 1-10

A biaxially oriented polypropylene film (trade name: U1, thickness: 20 μm, plane orientation coefficient: 0.012, manufactured by Mitsui Chemicals Tohcello, Inc.) was prepared as a resin substrate. A laminated film was formed in the same manner as in Example 1-9, except that the biaxially oriented polypropylene film was used instead of the biaxially oriented polypropylene film. The laminated film was evaluated in the same manner as in Example 1-9. The results are shown in Table 2.

Comparative Example 1-2

An aqueous polyurethane resin emulsion (trade name: WS 5000, manufactured by Mitsui Takeda Chemicals, Inc.) was prepared as a mixed solution for forming the underlayer. A laminated film was formed in the same manner as in Comparative Example 1-1, except that the aqueous polyurethane resin emulsion was used instead of the mixed solution A. The laminated film was evaluated in the same manner as in Comparative Example 1-1. The results are shown in Table 2.

TABLE 2

| No. | Composition of coating layer (mass %) | | | | Oxygen permeation rate (ml/m²/day) |
|---|---|---|---|---|---|
| | PVA | GPTMS | TEOS | Mon. | |
| Example 1-9 | 35 | 5 | 57 | 3 | 2.14 |
| Example 1-10 | 35 | 5 | 57 | 3 | 0.83 |
| Comparative Example 1-2 | 35 | 0 | 62 | 3 | 4.58 |

As shown in Table 2, it was confirmed that the laminated films of Examples 1-9 and 1-10 where the composition of the resin substrate or the underlayer was changed from that of Examples 1-1 to 1-8 also had good oxygen barrier properties. The oxygen permeation rate was high in Comparative Example 1-2 where a silane coupling agent was not contained.

Example 1-11

A biaxially oriented polypropylene film (trade name: VPH 2011, thickness: 20 μm, plane orientation coefficient: 0.011, manufactured by A.J. Plast Public Company Limited) was prepared as a resin substrate. The mixed solution A was applied onto a surface of the biaxially oriented polypropylene film by gravure coating. Then, the applied mixed solution A was dried to form an underlayer on the surface of the biaxially oriented polypropylene film. In a vacuum vapor deposition apparatus using an electron beam heating method, metallic aluminum was evaporated, and oxygen gas was introduced to form a deposited thin film layer made of aluminum oxide and having a thickness of 20 nm on the underlayer.

The mixed solution B was applied onto the deposited thin film layer by gravure coating in the same manner as in Example 1-1. Then, the applied mixed solution B was dried to form a coating layer on the deposited thin film layer. In this way, a laminated film of Example 1-11 was fabricated. The thickness of the underlayer of the laminated film was about 60 to 70 nm, and the thickness of the coating layer of the laminated film was about 0.4 to 0.6 μm. The laminated film was evaluated in the same manner as in Example 1-1. The results are shown in Table 3.

Example 1-12

A laminated film was formed in the same manner as in Example 1-11, except that, instead of metallic aluminum, a mixed material containing two or more of metallic silicon, silicon monoxide and silicon dioxide was evaporated to form a deposited thin film layer made of silicon oxide and having a thickness of 20 μm on the underlayer. The laminated film was evaluated in the same manner as in Example 1-11. The results are shown in Table 3.

Example 1-13

As a mixed solution for forming an underlayer, γ-isocyanatepropyltrimethylsilane, acrylic polyol, and aliphatic xylene diisocyanate were blended in a dilution solvent (ethyl acetate) at a mass ratio of 11:53:37 to prepare a mixed solution D (solid content: 5 mass %). A laminated film was formed in the same manner as in Example 1-12, except that the mixed solution D was used instead of the mixed solution A. The thickness of the underlayer of the laminated film was about 140 to 150 nm. The laminated film was evaluated in the same manner as in Example 1-12. The results are shown in Table 3.

TABLE 3

| No. | Composition of coating layer (mass %) | | | | Oxygen permeation rate (ml/m$^2$/day) |
|---|---|---|---|---|---|
| | PVA | GPTMS | TEOS | Mon. | |
| Example 1-11 | 35 | 5 | 57 | 3 | 2.00 |
| Example 1-12 | 35 | 5 | 57 | 3 | 0.21 |
| Example 1-13 | 35 | 5 | 57 | 3 | 0.13 |

As shown in Table 3, it was confirmed that the laminated films of Examples 1-11 to 1-13 provided with the deposited thin film layer also had good oxygen barrier properties.

Example 2-1

As a mixed solution for forming an underlayer, γ-isocyanatepropyltrimethylsilane, acrylic polyol, and aliphatic xylene diisocyanate were blended in a dilution solvent (ethyl acetate) at a mass ratio of 11:53:37 to prepare a mixed solution A (solid content: 2 mass %). The mixed solution A was applied on a surface of a biaxially oriented polypropylene film, prepared as a resin substrate, by gravure coating. Then, the applied mixed solution A was dried to form an underlayer on the surface of the biaxially oriented polypropylene film. The biaxially oriented polypropylene film used was a commercially available product (trade name: PJ 201, thickness: 20 μm, plane orientation coefficient: 0.011, manufactured by A.J. Plast Public Company Limited) composed of a homopolymer type polypropylene film and a copolymer type polypropylene film.

Four components of polyvinyl alcohol (PVA, number average molecular weight: 75000), γ-glycidoxypropyltrimethoxysilane (GPTMS), tetraethoxysilane (TEOS), and montmorillonite (Mon.) were blended in water at a mass ratio shown in Table 4 to prepare a mixed solution B. The mixed solution B was applied onto the underlayer by gravure coating. Then, the applied mixed solution B was heated and dried to form a coating layer on the underlayer. In this way, a laminated film of Example 2-1 was fabricated. The thickness of the underlayer of the laminated film was about 60 to 70 nm, and the thickness of the coating layer of the laminated film was about 0.4 to 0.6 μm.

An unstretched polypropylene film was bonded by dry lamination to the coating layer of the laminated film via a two-part curable urethane adhesive to fabricate a film for evaluation. The oxygen permeation rate of the obtained film for evaluation was measured using an oxygen permeability measurement apparatus (apparatus name: OXTRAN 2/21, manufactured by MOCON Inc.). The measurement atmosphere was 30° C. and 70% RH. The measurement results are shown in Table 4.

The lamination strength of the aforementioned film for evaluation was measured. Specifically, the lamination strength was measured by a T-peel method (crosshead speed: 300 mm/min) using a Tensilon type universal material tester (trade name: Tensilon universal material testing machine, manufactured by A&D Company, Limited) according to JIS Z 0238: 1998. The measurement results are shown in Table 4.

Examples 2-2 to 2-5 and Comparative Example 2-1

Laminated films were formed in the same manner as in Example 2-1, except that the mass ratios of polyvinyl alcohol, γ-glycidoxypropyltrimethoxysilane, tetraethoxysilane, and montmorillonite in the mixed solution B were changed as shown in Table 4. The laminated films were evaluated in the same manner as in Example 2-1. The results are shown in Table 4.

Example 2-6

An aqueous polyurethane resin emulsion (trade name: WS 5000, manufactured by Mitsui Takeda Chemicals, Inc.) was prepared as a mixed solution for forming the underlayer. A laminated film was formed in the same manner as in Example 2-3, except that the aqueous polyurethane resin emulsion was used instead of the mixed solution A. The laminated film was evaluated in the same manner as in Example 2-3. The results are shown in Table 4.

Example 2-7

A biaxially oriented polypropylene film (trade name: U1, thickness: 20 μm, plane orientation coefficient: 0.012, manufactured by Mitsui Chemicals Tohcello, Inc.) was prepared as a resin substrate. A laminated film was formed in the same manner as in Example 2-6, except that the biaxially oriented polypropylene film was used as a resin substrate. The laminated film was evaluated in the same manner as in Example 2-6. The results are shown in Table 4.

Comparative Example 2-2

An aqueous polyurethane resin emulsion (trade name: WS 5000, manufactured by Mitsui Takeda Chemicals, Inc.) was prepared as a mixed solution for forming the underlayer. A laminated film was formed in the same manner as in Comparative Example 2-1, except that the aqueous polyurethane resin emulsion was used instead of the mixed solution A. The laminated film was evaluated in the same manner as in Comparative Example 2-1. The results are shown in Table 4.

Comparative Example 2-3

A biaxially oriented polypropylene film (trade name: U1, thickness: 20 μm, plane orientation coefficient: 0.012, manufactured by Mitsui Chemicals Tohcello, Inc.) was prepared as a resin substrate. A laminated film was formed in the same manner as in Comparative Example 2-2, except that the biaxially oriented polypropylene film was used. The laminated film was evaluated in the same manner as in Comparative Example 2-2. The results are shown in Table 4.

TABLE 4

| No. | Composition of coating layer (mass %) | | | | Oxygen permeation rate (ml/m²/day) | Laminate strength (N/15 mm) |
| --- | --- | --- | --- | --- | --- | --- |
| | PVA | GPTMS | TEOS | Mon. | | |
| Example 2-1 | 35 | 1 | 61 | 3 | 3.69 | 2.10 |
| Example 2-2 | 35 | 3 | 59 | 3 | 2.10 | 2.10 |
| Example 2-3 | 35 | 5 | 57 | 3 | 1.49 | 2.00 |
| Example 2-4 | 35 | 7 | 55 | 3 | 1.49 | 2.20 |
| Example 2-5 | 35 | 10 | 52 | 3 | 1.13 | 2.80 |
| Example 2-6 | 35 | 5 | 57 | 3 | 2.14 | 1.50 |
| Example 2-7 | 35 | 5 | 57 | 3 | 0.83 | 1.50 |
| Comparative Example 2-1 | 35 | 0 | 62 | 3 | 3.72 | 2.10 |
| Comparative Example 2-2 | 35 | 0 | 62 | 3 | 4.58 | 0.70 |
| Comparative Example 2-3 | 35 | 0 | 62 | 3 | 1.56 | 0.40 |

As shown in Table 4, the laminated films of Examples 2-1 to 2-7 had high and stable lamination strength. Comparing Example 2-3 with Examples 2-6 and 2-7 where the compositions of the coating layer were the same and the compositions of the underlayer were different, the difference in lamination strength was 0.5 N/15 mm. From this, it was confirmed that the laminate films of the Examples hardly depended on the composition of the underlayer, and variation of the lamination strength was reduced. Therefore, the degree of freedom of material selection of the underlayer is increased.

In contrast, in the case of Comparative Examples 2-1 to 2-3 where the coating layer did not contain a silane coupling agent, comparing Comparative Example 2-1 with Comparative Examples 2-2 and 2-3 where the compositions of the coating layer were the same and the compositions of the underlayer were different, the difference in lamination strength was 1.4 to 1.7 N/15 mm. From this, it was confirmed that the lamination strengths of the laminate films of Comparative Examples were greatly varied as the composition of the underlayer was changed. That is, it was confirmed that the lamination strength of the laminated film greatly depended on the composition of the underlayer. It was confirmed that the laminated films of Examples 2-2 to 2-7 had very good oxygen barrier properties.

Example 3-1

As a mixed solution for forming the underlayer, γ-isocyanatepropyltrimethylsilane, acrylic polyol, and aliphatic xylene diisocyanate were blended in a dilution solvent (ethyl acetate) at a mass ratio of 11:53:37 to prepare a mixed solution A (solid content: 2 mass %). The mixed solution A was applied onto a surface of a biaxially oriented polypropylene film, prepared as a resin substrate, by gravure coating. Then, the applied mixed solution A was dried to form an underlayer on the surface of the biaxially oriented polypropylene film. The thickness of the underlayer a was about 60 to 70 nm. The biaxially oriented polypropylene film used was a commercially available product (trade name: PJ 201, thickness: 20 μm, plane orientation coefficient: 0.011, manufactured by A.J. Plast Public Company Limited) composed of a homopolymer type polypropylene film and a copolymer type polypropylene film.

A mixed material containing two or more of metallic silicon, silicon monoxide, and silicon dioxide was evaporated using a vacuum deposition apparatus based on an electron beam heating method to form a deposited thin film layer made of silicon oxide and having a thickness of 20 nm on the underlayer a. In this way, a laminated film of Example 3-1 was fabricated.

An unstretched polypropylene film was bonded by dry lamination to the deposited thin film layer of the fabricated laminated film via a two-part curable urethane adhesive to fabricate a film for evaluation. The moisture permeation rate of the obtained film for evaluation was measured using a moisture permeability measurement apparatus (apparatus name: PERMARTRAN 3/31, manufactured by MOCON Inc.). The measurement atmosphere was 40° C. and 90% RH. The measurement results are shown in Table 5. The oxygen permeation rate of the film for evaluation was measured using an oxygen permeability measurement apparatus (apparatus name: OXTRAN 2/21, manufactured by MOCON Inc.). The measurement atmosphere was 30° C. and 70% RH. The measurement results are shown in Table 5.

Example 3-2

As a mixed solution for forming an underlayer, γ-isocyanatepropyltrimethylsilane, acrylic polyol, and aliphatic xylene diisocyanate were blended in a dilution solvent (ethyl acetate) at a mass ratio of 11:53:37 to prepare a mixed solution B (solid content: 5 mass %). A laminated film was formed in the same manner as in Example 3-1, except that the mixed solution B was used instead of the mixed solution A. The thickness of the underlayer b of the laminated film was about 140 to 150 nm. The laminated film was evaluated in the same manner as in Example 3-1. Evaluation results are shown in Table 5.

Example 3-3

Four components of polyvinyl alcohol (PVA, number average molecular weight: 75000), γ-glycidoxypropyltrimethoxysilane (GPTMS), tetraethoxysilane (TEOS), and montmorillonite (Mon.) were blended in water at a mass ratio of 35:5:57:3 to prepare a mixed solution C. The mixed solution C was applied onto the deposited thin film layer of the laminated film fabricated in Example 3-1 by gravure coating. Then, the applied mixed solution C was heated and dried to form a coating layer on the deposited thin film layer. In this way, a laminated film of Example 3-3 was fabricated. The thickness of the coating layer was about 0.4 to 0.6 μm. The laminated film was evaluated in the same manner as in Example 3-1. Evaluation results are shown in Table 5.

Example 3-4

A coating layer was formed on the deposited thin film layer in the same manner as in Example 3-3, except that the laminated film of Example 3-2 was used instead of the laminated film fabricated in Example 3-1. In this way, a laminated film of Example 3-4 was fabricated. The thickness of the coating layer was about 0.4 to 0.6 μm. The laminated film was evaluated in the same manner as in Example 3-1. Evaluation results are shown in Table 5.

Comparative Example 3-1

The same biaxially oriented polypropylene film (thickness: 20 μm) as in Example 3-1 was prepared as a resin substrate. On a surface of this resin substrate, metallic aluminum was evaporated and oxygen gas was introduced using a vacuum vapor deposition apparatus using an electron beam heating method to form a deposited thin film layer made of aluminum oxide and having a thickness of 20 nm on the resin substrate. This product was used as a laminated film of Comparative Example 3-1. The laminated film was evaluated in the same manner as in Example 3-1. Evaluation results are shown in Table 5.

Comparative Example 3-2

A laminated film was fabricated in the same manner as in Example 3-1, except that, instead of the deposited thin film layer made of silicon oxide, a deposited thin film layer made of aluminum oxide having a thickness of 20 nm was formed on the underlayer a. The laminated film was evaluated in the same manner as in Example 3-1. Evaluation results are shown in Table 5.

Comparative Example 3-3

A laminated film was fabricated in the same manner as in Example 3-3, except that the laminated film of Comparative Example 3-2 was used instead of the laminated film fabricated in Example 3-1. In this way, a laminated film of Comparative Example 3-3 was prepared. The thickness of the coating layer was about 0.4 to 0.6 μm. The laminated film was evaluated in the same manner as in Example 3-1. Evaluation results are shown in Table 5.

Comparative Example 3-4

A laminated film was fabricated in the same manner as in Example 3-1, except that the underlayer a was not formed. This product was used as a laminated film of Comparative Example 3-4. The laminated film was evaluated in the same manner as in Example 3-1. Evaluation results are shown in Table 5.

TABLE 5

| No. | Underlayer | Deposited thin film layer | Coating layer | Moisture permeation rate ($g/m^2/day$) | Oxygen permeation rate ($ml/m^2/day$) |
|---|---|---|---|---|---|
| Example 3-1 | a | Silicon oxide | None | 1.33 | 20.90 |
| Example 3-2 | b | Silicon oxide | None | 0.85 | 13.70 |
| Example 3-3 | a | Silicon oxide | Exists | 0.74 | 0.21 |
| Example 3-4 | b | Silicon oxide | Exists | 0.55 | 0.13 |
| Comparative Example 3-1 | None | Aluminum oxide | None | 8.24 | 87.20 |
| Comparative Example 3-2 | a | Aluminum oxide | None | 5.90 | 37.10 |
| Comparative Example 3-3 | a | Aluminum oxide | Exists | 6.14 | 2.00 |
| Comparative Example 3-4 | None | Silicon oxide | Exists | 5.36 | 62.70 |

As shown in Table 5, the laminated films of Examples 3-1 to 3-4, in each of which the biaxially oriented polypropylene film and the deposited thin film layer containing silicon oxide were laminated via the underlayer, had sufficiently low moisture permeability. It was also confirmed that the laminated films of Examples 3-3 and 3-4, each having the coating layer covering the deposited thin film layer, could sufficiently reduce both moisture permeability and oxygen permeability. On the other hand, the laminated films of Comparative Examples 3-1 to 3-3 each having no deposited thin film layer containing silicon oxide, and Comparative Example 3-4 having no underlayer had higher moisture permeability than any of the Examples.

INDUSTRIAL APPLICABILITY

A laminated film having good oxygen barrier properties, and a packaging bag are provided. A laminated film capable of reducing variation in lamination strength caused by a change in the composition of an underlayer is provided. In addition, a packaging bag having good sealing performance is provided by providing the aforementioned laminated film. A laminated film having good moisture barrier properties, and a packaging bag are provided.

REFERENCE SIGNS LIST

10, 10A: Resin substrate; 20: Underlayer; 30, 40: Coating layer; 45, 50: Deposited thin film layer; 100, 101, 102, 300, 301: Laminated film; 200: Packaging bag; 211: Sealing region; 214: Side end portion; 215: Non-sealing region; 216: Lower end portion; 217: Upper end portion; 218: Storage region; 220: Opening means; 221: Half-cut line; 224: Easy opening processing portion; 230: Resealing means

What is claimed is:

1. A laminated film, comprising:
   a resin substrate;
   a coating layer on the resin substrate; and,
   a deposited thin film layer in between the resin substrate and the coating layer, the deposited thin film layer contains a silicon oxide and has a thickness of 5 to 100 nm,
   wherein the coating layer contains a water-soluble polymer, at least one of a silane coupling agent and a hydrolysate thereof, at least one of a metal alkoxide and a hydrolysate thereof, and an inorganic layered compound, and
   wherein the content of the inorganic layered compound in the coating layer is 2 to 10 mass %.

2. The laminated film of claim 1, wherein the resin substrate has a biaxially oriented polypropylene film.

3. The laminated film of claim 1, wherein the laminated film includes an underlayer between the resin substrate and the coating layer.

4. The laminated film of claim 3, wherein
   the underlayer contains an organic polymer as a main component, and
   the organic polymer contains at least one of polyols, organosilane compounds, water-based polyurethane resins, and reaction products of the polyols and the organosilane compounds.

5. The laminated film of claim 1, wherein at least one of the silane coupling agent and the hydrolysate thereof has an epoxy group.

6. The laminated film of claim 1, wherein the content of the silane coupling agent and the hydrolysate thereof in the coating layer is 1 to 15 mass % in total.

7. The laminated film of claim 1, wherein the laminated film has a lamination strength of 2 N/15 mm or more.

8. The laminated film of claim 1, wherein the laminated film has a moisture permeation rate of 2 $g/m^2/day$ or less.

9. The laminated film of claim 1, wherein the laminated film has an oxygen permeation rate of 2 $ml/m^2/day$ or less.

10. A packaging bag
    comprising the laminated film of claim 1.

11. The laminated film of claim 1, wherein the content of the inorganic layered material in the coating layer is from 2 mass % to 5 mass %.

12. The laminated film of claim 11, wherein the content of the inorganic layered material in the coating layer is from 3 mass % to 5 mass %.

13. The laminated film of claim 11, wherein the inorganic layered material is montmorillonite.

14. A laminated film, comprising:
   a resin substrate having a biaxially oriented polypropylene film;
   a deposited thin film layer, which contains a silicon oxide and has a thickness of 5 to 100 nm;
   an underlayer containing an organic polymer as a main component, the underlayer being located between the resin substrate and the deposited thin film layer; and
   a coating layer on a side opposite to the underlayer side of the deposited thin film layer, the coating layer contains a water-soluble polymer, at least one of a silane coupling agent and a hydrolysate thereof, at least one of a metal alkoxide and a hydrolysate thereof, and an inorganic layered compound, wherein the content of the inorganic layered compound in the coating layer is 2 to 10 mass %.

15. The laminated film of claim 14, wherein the organic polymer in the underlayer contains at least one of polyols, organosilane compounds, water-based polyurethane resins, and reaction products of the polyols and the organosilane compounds.

16. The laminated film of claim 14, wherein the laminated film has a lamination strength of 2 N/15 mm or more.

17. The laminated film of claim 14, wherein the laminated film has a moisture permeation rate of 2 $g/m^2$/day or less.

18. The laminated film of claim 14, wherein the laminated film has an oxygen permeation rate of 2 $ml/m^2$/day or less.

19. A packaging bag comprising the laminated film of claim 14.

20. The laminated film of claim 14, wherein the content of the inorganic layered material in the coating layer is from 2 mass % to 5 mass %.

21. The laminated film of claim 20, wherein the inorganic layered material is montmorillonite.

* * * * *